(12) United States Patent
Dvorak

(10) Patent No.: US 11,657,217 B2
(45) Date of Patent: May 23, 2023

(54) METHODS AND SYSTEMS FOR PRESENTING DROP-DOWN, POP-UP OR OTHER PRESENTATION OF A MULTI-VALUE DATA SET IN A SPREADSHEET CELL

(71) Applicant: Adaptam Inc., Palo Alto, CA (US)

(72) Inventor: Robert E. Dvorak, Portola Valley, CA (US)

(73) Assignee: Adaptam Inc., Palo Alto, CA (US)

( * ) Notice: Subject to any disclaimer, the term of this patent is extended or adjusted under 35 U.S.C. 154(b) by 0 days.

(21) Appl. No.: 17/359,418

(22) Filed: Jun. 25, 2021

(65) Prior Publication Data

US 2021/0406458 A1    Dec. 30, 2021

Related U.S. Application Data

(60) Provisional application No. 63/044,989, filed on Jun. 26, 2020, provisional application No. 63/044,990, filed on Jun. 26, 2020.

(51) Int. Cl.
| | |
|---|---|
| *G06F 3/048* | (2013.01) |
| *G06F 40/18* | (2020.01) |
| *G06F 9/451* | (2018.01) |
| *G06F 3/0482* | (2013.01) |
| *G06F 3/0489* | (2022.01) |

(52) U.S. Cl.
CPC .......... *G06F 40/18* (2020.01); *G06F 3/0482* (2013.01); *G06F 3/0489* (2013.01); *G06F 9/451* (2018.02); *G06F 9/453* (2018.02)

(58) Field of Classification Search
None
See application file for complete search history.

(56) References Cited

U.S. PATENT DOCUMENTS

| | | | |
|---|---|---|---|
| 5,815,421 | A | 9/1998 | Dulong et al. |
| 6,038,567 | A | 3/2000 | Young |
| 6,317,750 | B1 | 11/2001 | Tortolani et al. |

(Continued)

OTHER PUBLICATIONS

"Parts of an Algebraic Expression", Nelson Mathematics Secondary Year Two, Cycle One, 2009, Nelson Education Ltd., 4 pages.

(Continued)

*Primary Examiner* — Claudia Dragoescu
(74) *Attorney, Agent, or Firm* — Haynes Beffel & Wolfeld, LLP; Ernest J. Beffel, Jr.

(57) ABSTRACT

The technology disclosed relates to accessing data within or external to spreadsheet cells (NSC data) and presenting it to users, so they can select one or more value to populate the cell. In one implementation, the technology disclosed is a spreadsheet function (predefined formula) where the user inputs a cell range or NSC data formula resulting in a button operated drop-down (pop-up or other visual) populating one value within the cell. Once the formula is completed the user can change that value by clicking the button and selecting the desired value from the multiple values presented. In another implementation the function input can be altered to add a constraint (filter) limiting the values presented for selection. In variants of any of the implementations, the presented values can be organized in ascending or descending orders for easy selection and show all values or only the unique (distinct) values.

44 Claims, 27 Drawing Sheets

(56) References Cited

U.S. PATENT DOCUMENTS

| | | | |
|---|---|---|---|
| 6,985,895 B2 | 1/2006 | Witkowski et al. |
| 6,988,241 B1 | 1/2006 | Guttman et al. |
| 7,099,890 B2 | 8/2006 | Cahill et al. |
| 7,117,435 B1 | 10/2006 | Kotler et al. |
| 7,120,866 B2 | 10/2006 | Kotler et al. |
| 7,155,667 B1 | 12/2006 | Kotler et al. |
| 7,302,444 B1 | 11/2007 | Dunmore et al. |
| 7,350,141 B2 | 3/2008 | Kotler et al. |
| 7,370,274 B1 | 5/2008 | Stuple et al. |
| 7,412,645 B2 | 8/2008 | Kotler et al. |
| 7,506,242 B2 | 3/2009 | Kotler et al. |
| 7,506,243 B2 | 3/2009 | Kotler et al. |
| 7,523,390 B2 | 4/2009 | Kotler et al. |
| 7,546,533 B2 | 6/2009 | Sareen et al. |
| 7,549,115 B2 | 6/2009 | Kotler et al. |
| 7,673,227 B2 | 3/2010 | Kotler et al. |
| 7,702,997 B2 | 4/2010 | Kotler et al. |
| 7,702,998 B2 | 4/2010 | Kotler et al. |
| 7,810,032 B2 | 10/2010 | Bauchot et al. |
| 8,140,549 B2 | 3/2012 | Barinaga |
| 8,286,072 B2 | 10/2012 | Chamberlain et al. |
| 8,312,371 B2 | 11/2012 | Ording |
| 8,341,512 B2 | 12/2012 | Sol et al. |
| 8,726,143 B2 | 5/2014 | Simkhay et al. |
| 9,092,412 B2 | 7/2015 | Saleh et al. |
| 9,305,176 B2 | 4/2016 | Gloski et al. |
| 9,436,637 B2 | 9/2016 | Kommanaboyina |
| 9,558,232 B1 | 1/2017 | Taylor et al. |
| 9,727,989 B2 | 8/2017 | Garg et al. |
| 9,990,349 B2 | 6/2018 | Campbell et al. |
| 10,019,758 B2 | 7/2018 | Bartolucci |
| 10,140,352 B2 | 11/2018 | Hariharan et al. |
| 10,409,892 B2 | 9/2019 | Rothschiller et al. |
| 10,685,174 B2 | 6/2020 | Bastide et al. |
| 11,036,929 B2 | 6/2021 | Dvorak |
| 2002/0036662 A1 | 3/2002 | Gauthier et al. |
| 2002/0169799 A1 | 11/2002 | Voshell |
| 2003/0009411 A1 | 1/2003 | Ram et al. |
| 2003/0110191 A1 | 6/2003 | Handsaker et al. |
| 2003/0212953 A1 | 11/2003 | Serraf |
| 2004/0158557 A1* | 8/2004 | Weicker ............. G06F 16/2428 |
| 2005/0015379 A1 | 1/2005 | Aureglia et al. |
| 2005/0044496 A1 | 2/2005 | Kotler et al. |
| 2006/0069635 A1 | 3/2006 | Ram et al. |
| 2006/0129809 A1 | 6/2006 | Battagin et al. |
| 2006/0131383 A1 | 6/2006 | Battagin et al. |
| 2007/0005635 A1 | 1/2007 | Martinez et al. |
| 2007/0136666 A1 | 6/2007 | Khen et al. |
| 2009/0031205 A1 | 1/2009 | Aureglia et al. |
| 2009/0031206 A1 | 1/2009 | Aureglia et al. |
| 2009/0228776 A1 | 9/2009 | Foiling et al. |
| 2010/0211862 A1 | 8/2010 | Parish et al. |
| 2012/0110001 A1 | 5/2012 | Young |
| 2013/0013994 A1 | 1/2013 | Handsaker et al. |
| 2013/0021377 A1 | 1/2013 | Doll |
| 2013/0073939 A1 | 3/2013 | Honsowetz |
| 2013/0091419 A1* | 4/2013 | Caliman ............... G06F 40/169 715/236 |
| 2015/0082137 A1 | 3/2015 | Zarpas |
| 2015/0149893 A1 | 5/2015 | Lukic et al. |
| 2015/0169532 A1 | 6/2015 | Otero et al. |
| 2015/0199328 A1 | 7/2015 | Danziger et al. |
| 2015/0254226 A1 | 9/2015 | Renshaw et al. |
| 2016/0055139 A1 | 2/2016 | Creason et al. |
| 2016/0124932 A1 | 5/2016 | Chen et al. |
| 2016/0142488 A1 | 5/2016 | Adler et al. |
| 2016/0371249 A1 | 12/2016 | Chilakamarri et al. |
| 2017/0004125 A1 | 1/2017 | Honsowetz |
| 2017/0124046 A1 | 5/2017 | Campbell et al. |
| 2017/0124049 A1 | 5/2017 | Campbell et al. |
| 2017/0124054 A1 | 5/2017 | Campbell et al. |
| 2017/0124142 A1* | 5/2017 | Becker .................... G06F 40/18 |
| 2019/0012305 A1 | 1/2019 | Dvorak |
| 2019/0012306 A1 | 1/2019 | Dvorak |
| 2020/0030201 A1 | 1/2020 | Murakoso et al. |
| 2020/0034415 A1 | 1/2020 | Gordon et al. |
| 2020/0167321 A1* | 5/2020 | Sheehan ............. G06F 21/6209 |
| 2020/0184149 A1 | 6/2020 | Honsowetz et al. |
| 2020/0257852 A1 | 8/2020 | Canton et al. |
| 2020/0285694 A1 | 9/2020 | Nield |
| 2021/0209296 A1* | 7/2021 | Prakash .................. G06F 9/453 |

OTHER PUBLICATIONS

"Apply multiple styles to single text selection", Microsoft Community, answers.mircrosoft,com, Apr. 9, 2018, 3 pages (accessed Apr. 21, 2020 at https://answers.microsoft.com/en-us/msoffice/forum/msoffice_word-mso-mso_mac2011/apply-multiple-styles-to-single-text-selection/654ca4ad-a202-43aa-b7e1-b4c7cdea5acb).

Understanding Styles in Microsoft Word—A Tutorial in the Intermediate Users Guide to Microsoft Word, last edited by Charles Kenyon on Apr. 30, 2017, retrieved from http://www.addbalance.com/usersguide/styles.htm, archived on Jun. 30, 2017, 55 pages.

"Copying Formulas and using Relative and Absolute Cell References Tutorial", Mar. 16, 2016, www.teststeststests.com, pp. 1-13 (Year: 2016).

"How to create and share custom Stylesheets in Microsoft Word", PC World Magazine, Sep. 14, 2014, 13 pages (downloaded from https://web.archive.org/web/20140914082635/https://www.pcworld.com/article/2156364/how-to-create-and-share-custom-style-sets.html Jan. 6, 2021).

Sartain, JD, "How to create and share custom Style Sheets in Wordand PowerPoint", PC World Magazine, Aug. 8, 2018, 11 pages (downloaded from https://www.pcworld.com/article/2156364/how-to-create-and-share-custom-style-sets.html Jan. 6, 2021).

Microsoft Support—Turn on or off automatic bullets or numbering (downloaded from <https://support.microsoft.com/en-US/office/turn-on-or-off-automatic-bullets-or-numbering-ac3d9d00-0bb6-4421-92a6-f73e564ce71e>.

Microsoft Support—Define new bullets, numbers and multilevel lists (downloaded from https://support.microsoft.com/en-us/office/define-new-bullets-numbers-and-multilevel-lists-6c06ef65-27ad-4893-80c9-0b944cb81f5f#style <https://support.microsoft.com/en-us/office/define-new-bullets-numbers and-multilevel-ists-6c06ef65-27ad-4893-80c9-0b944cb81f5f>>. ).

Mynda Treacy, Excel VLOOKUP Multiple Sheets, Nov. 21, 2012, My Online Training Hub, pp. 1-7 (Year: 2012).

* cited by examiner

Create a drop-down list

*Excel for Office 365, Excel for Office 365 for Mac, Excel for the web, Excel 2019, Excel 2016, Excel 2019 for Mac, Excel 2013, Excel 2010, Excel 2007, Excel 2016 for Mac, Less*

1. In a new worksheet, type the entries you want to appear in your drop-down list. Ideally, you'll have your list items in an Excel table. If you don't, then you can quickly convert your list to a table by selecting any cell in the range, and pressing Ctrl+T.

Or highlight the range of data or data table create from the imported data

Notes:
   - Why should you put your data in a table? When your data is in a table, then as you add or remove items from the list, any drop-downs you based on that table will automatically update. You don't need to do anything else.
   - Now is a good time to Sort data in a range or table in your drop-down list.

2. Select the cell in the worksheet where you want the drop-down list.

3. Go to the Data tab on the Ribbon, then Data Validation. _____176

Note: If you can't click Data Validation, the worksheet might be protected or shared. Unlock specific areas of a protected workbook or stop sharing the worksheet, and then try step 3 again.

4. On the Settings tab, in the Allow box, click List.

FIG. 1
Prior Art

5. Click in the Source box, then select your list range. We put ours on a sheet called Cities, in range A2:A9. Note that we left out the header row, because we don't want that to be a selection option:

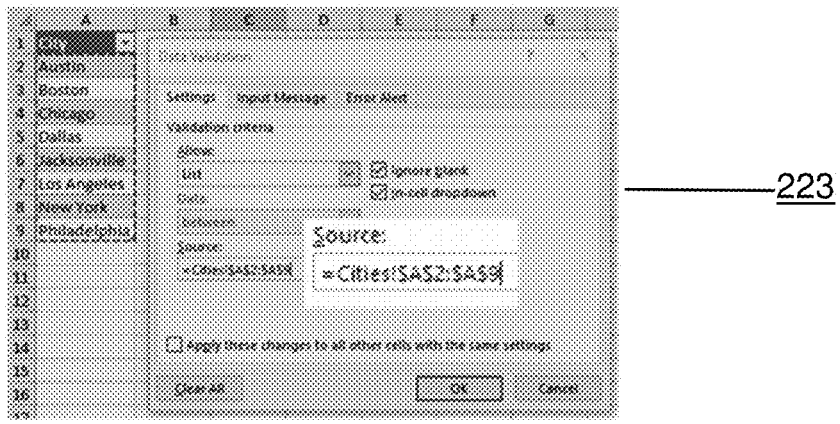
———223

6. If it's OK for people to leave the cell empty, check the Ignore blank box.

7. Check the In-cell dropdown box.

8. Click the Input Message tab.

• If you want a message to pop up when the cell is clicked, check the Show input message when cell is selected box, and type a title and message in the boxes (up to 225 characters). If you don't want a message to show up, clear the check box.

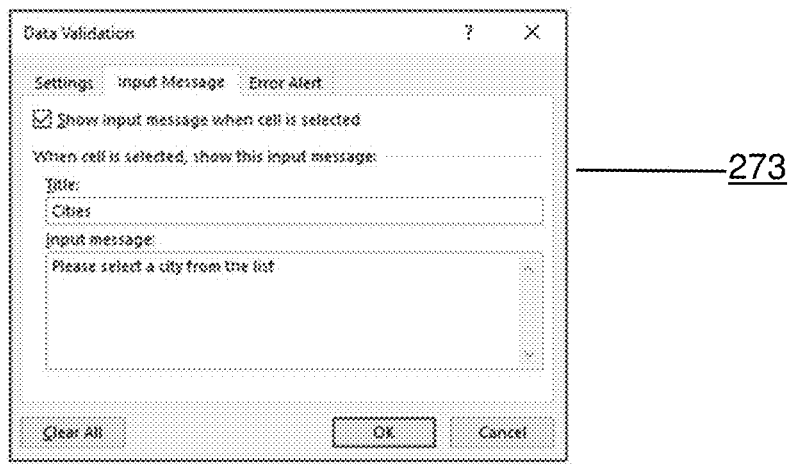
———273

FIG. 2
Prior Art

9. Click the Error Alert tab.

◦ If you want a message to pop up when someone enters something that's not in your list, check the Show error alert after invalid data is entered box, pick an option from the Style box, and type a title and message. If you don't want a message to show up, clear the check box.

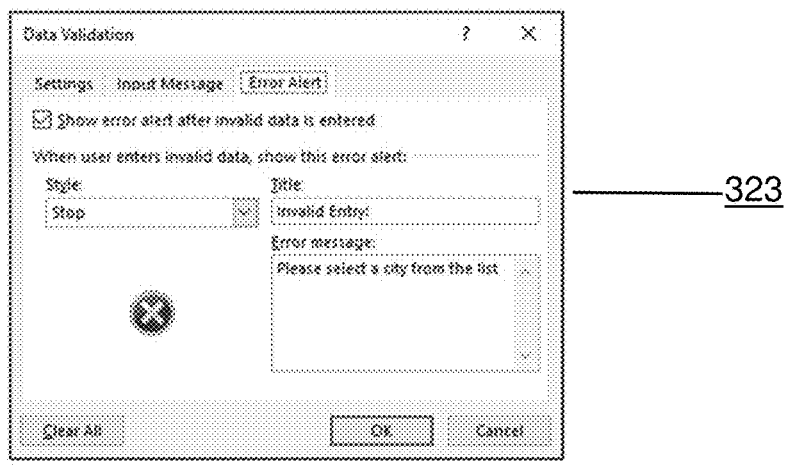
——323

10. Not sure which option to pick in the Style box?

◦ To show a message that doesn't stop people from entering data that isn't in the drop-down list, click Information or Warning. Information will show a message with this icon 🛈 and Warning will show a message with this icon ⚠ .

◦ To stop people from entering data that isn't in the drop-down list, click Stop.

Note: If you don't add a title or text, the title defaults to "Microsoft Excel" and the message to: "The value you entered is not valid. A user has restricted values that can be entered into this cell."

FIG. 3
Prior Art

Create an in-cell dropdown list

Create drop-down lists in a cell with Google Sheets.

1. Go to IT and get IT to create a data download for you,
2. Import the data download into you Sheets spreadsheet.
3. Select the cell where you want the drop-down.
4. Click on Data in the menu and select from the exposed list Data validation as shown below:

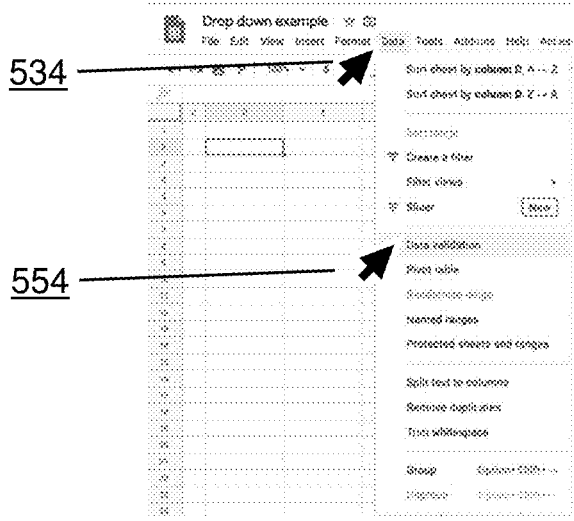

5. In the Data validation popup that shows up click to select the Criteria desired, List from a range, from the dropdown as shown below

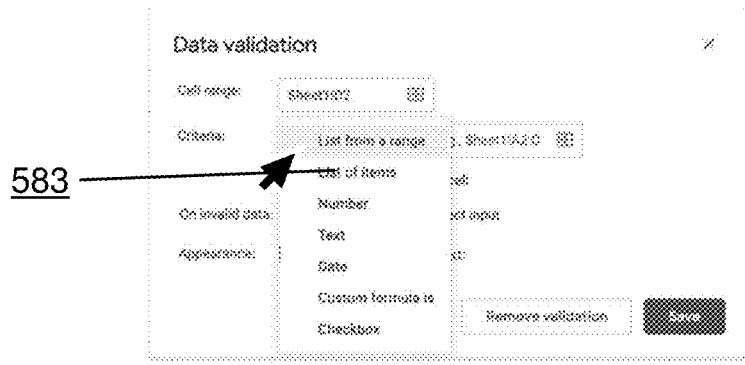

FIG. 5
Prior Art

6. Click in the range area as shown below
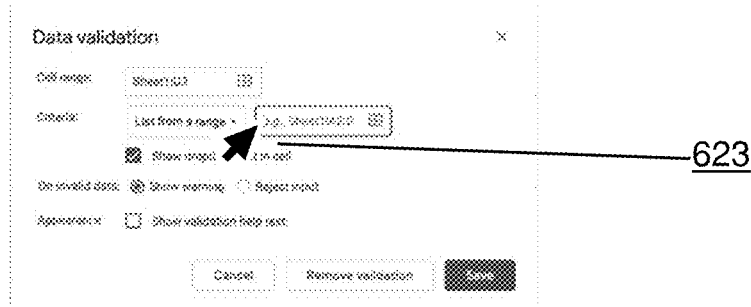
7. Get the range popup as shown below:
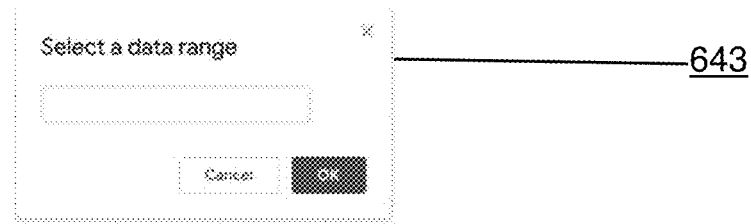
8. Find and highlight the desired data in you Sheet populating it in the range popup as shown below:
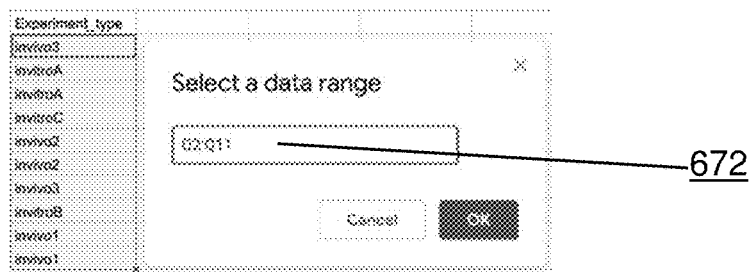
9. Click OK in the range popup to complete the range selection
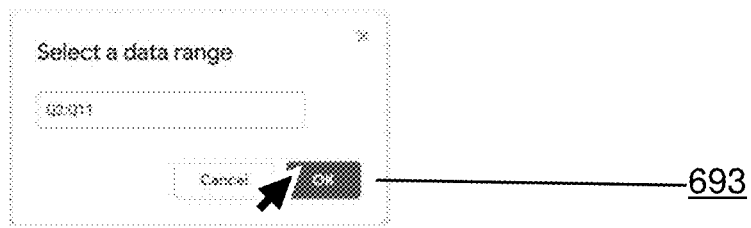
FIG. 6
Prior Art 10. Get back the Data validation popup populated as shown below:
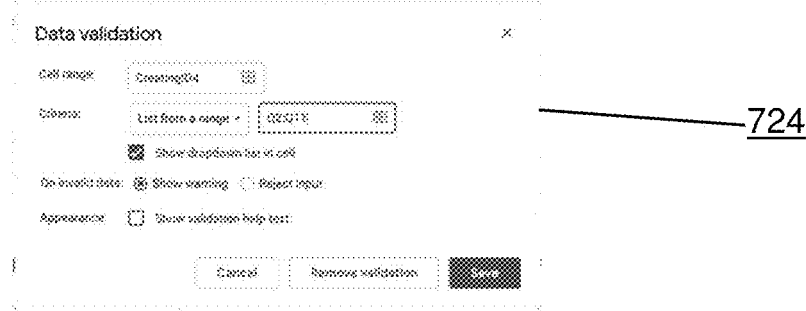
724
11. Click the Reject input button as shown below :
743
12. Click Save to get the drop-down button operating in the cell as shown below:
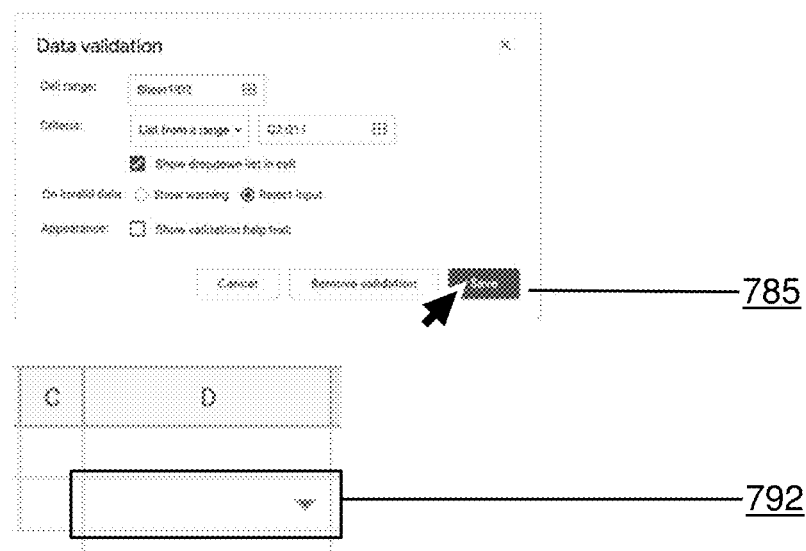
785
792
FIG. 7
Prior Art

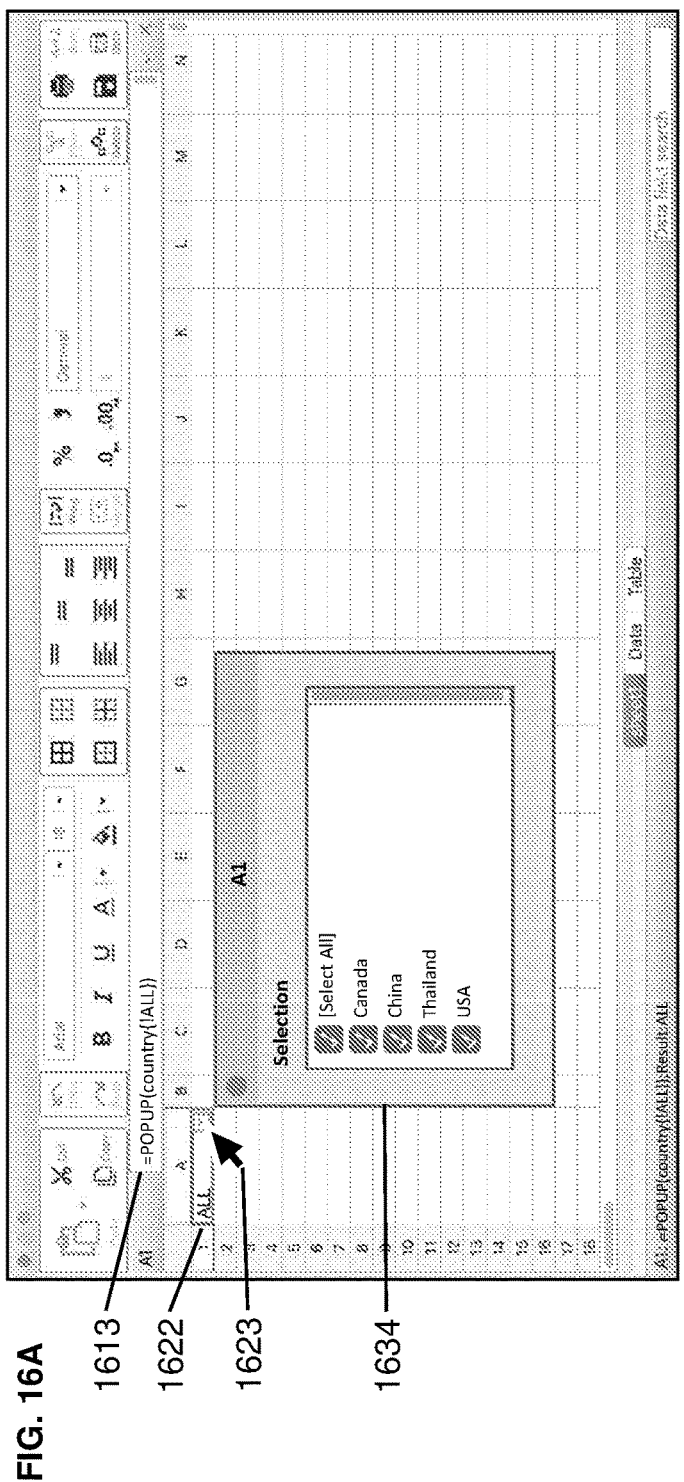
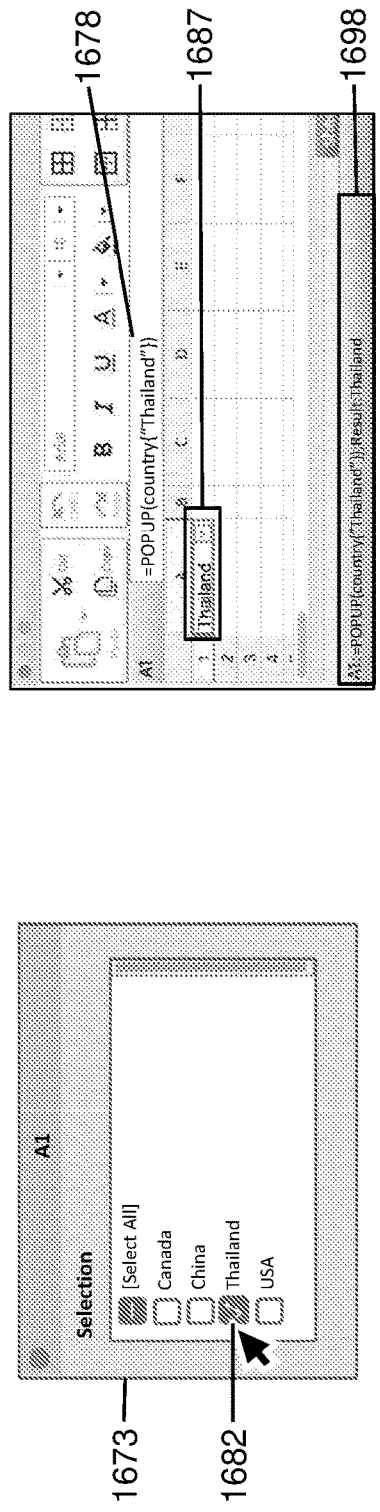
FIG. 16A
FIG. 16B
FIG. 16C

EXAMPLES OF MULTI-VALUE USING FUNCTIONS

| FUNCTION | VARIANTS |
|---|---|
| AGGREGATE | |
| AVEDEV | |
| AVERAGE | all variants (e.g., A, IF and IFS) |
| CONCAT | |
| COUNT | all variants (e.g., A, BLANK, IF and IFS) |
| COVAR | |
| COVARIANCE | P and S variants |
| DGET | |
| GEOMEAN | |
| HARMEAN | |
| LARGE | |
| MAX | all variants including DMAX |
| MEDIAN | |
| MIN | all variants including DMIN |
| MODE | all variants |
| PERCENTILE | all variants |
| PERCENTRANK | all variants |
| QUARTILE | All variants |
| RANK | all variants |
| SMALL | |
| STDEV | all variants including DSTDEV and its variants |
| SUBTOTAL | |
| SUM | All variants including DSUM |
| TRANSPOSE | |
| T.DIST | all variants of Student T test |
| T.TEST | |
| UNIQUE | |
| VAR | all variants including DVAR and its variants |
| Z.TEST | |

FIG. 25

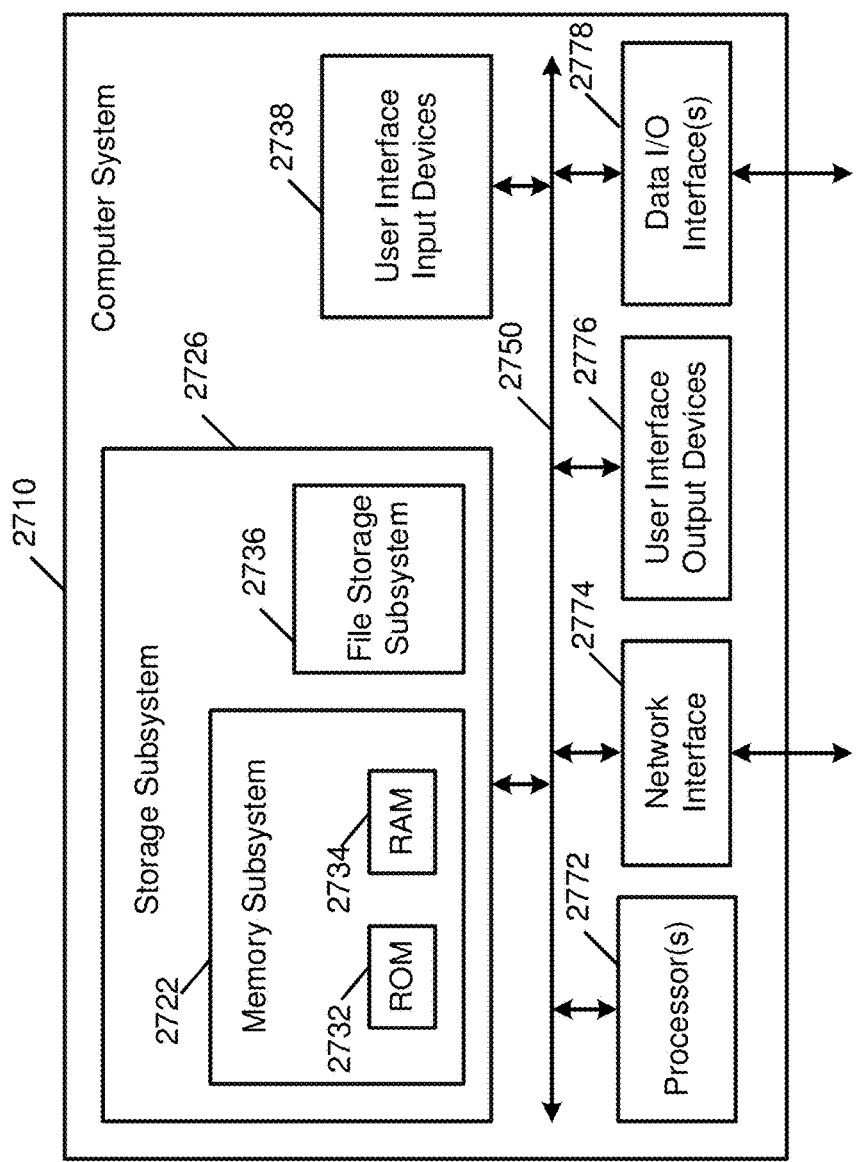
Fig. 27 Computer System

METHODS AND SYSTEMS FOR PRESENTING DROP-DOWN, POP-UP OR OTHER PRESENTATION OF A MULTI-VALUE DATA SET IN A SPREADSHEET CELL

CROSS-REFERENCE

This application claims priority to and the benefit of U.S. Application 63/044,989, entitled "Methods and Systems for Presenting Drop-Down, Pop-Up or Other Presentation of a Multi-Value Data Set in a Spreadsheet Cell", filed 26 Jun. 2020 and U.S. Application 63/044,990, entitled "Methods And Systems for Constructing A Complex Formula in a Spreadsheet Cell", filed 26 Jun. 2020 The priority applications are incorporated by reference herein.

RELATED APPLICATIONS

This application is related to and incorporates by reference contemporaneously filed U.S. application Ser. No. 17,359,430, titled "Methods And Systems for Constructing a Complex Formula in a Spreadsheet Cell", which claims the benefit of U.S. Provisional Application No. 63/44,990, filed 26 Jun. 2020.

This application is also related to and incorporates by reference the following applications:

U.S. application Ser. No. 16/031,339, titled "Methods and Systems for Providing Selective Multi-Way Replication and Atomization of Cell Blocks and Other Elements in Spreadsheets and Presentations", filed 10 Jul. 2018, now U.S. Pat. No. 11,182,548, issued 23 Nov. 2021, which claims the benefit of U.S. Provisional Application No. 62/530,835, filed Jul. 10, 2017, U.S. application Ser. No. 16/031,379, titled "Methods and Systems for Connecting a Spreadsheet to External Data Sources with Formulaic Specification of Data Retrieval", filed 10 Jul. 2018, now U.S. Pat. No. 11,354,494, issued 7 Jun. 2022, which claims the benefit of U.S. Provisional Application No. 62/530,786, filed Jul. 10, 2017, U.S. application Ser. No. 16/031,759, titled, "Methods and Systems for Connecting A Spreadsheet to External Data Sources with Temporal Replication of Cell Blocks", filed 10 Jul. 2018, now U.S. Pat. No. 11,017,165issued 25 May 2021, which claims the benefit of U.S. Provisional Patent Application No. 62/530,794, filed on Jul. 10, 2017, and U.S. application Ser. No. 16/191,402, titled, "Methods and Systems for Connecting A Spreadsheet to External Data Sources with Ordered Formulaic Specification of Data Retrieved" filed Nov. 14, 2018, now U.S. Pat. No. 11,036,929issued 15 Jun. 2021, which claims the benefit of U.S. Provisional Patent Application No. 62/586,719," filed on Nov. 15, 2017.

BACKGROUND

As spreadsheet capabilities have grown so have the needs of users. They now want to analyze more data with analyses that they can easily change. They often share those analyses with other people and would like to simplify their use. However, adding dropdown selectors as inputs to their regular cell formulas is a complicated process that few users undertake, and those dropdowns are limited to single selections. Regular cell formulas lack the ability of a spreadsheet Pivot Table to have multi-select filters, but Pivot Tables are more complicated than writing a typical formula and therefore know by only a fraction of users. They are also very limited in functions which work in them and much more limited in the formulas they support.

Users would benefit from a very simple way to create single and multiple value dropdown, pop-up or other formula constraint/filter selectors which work with normal cell formulas. Creating a formula including range or array functions (e.g., regular functions like SUM, COUNT, and more specialized functions like AVEDEV, COVAR and RANK) using an input where a user can change the calculation from doing one month to any number of months by selecting in a picklist. A formula as complicated as they would like, going well beyond the limitations of a Pivot Table, and working just like their current formulas. A picklist that does not allow users to make wrong inputs and works like they are familiar with in the spreadsheet table filtering. A capability that works with cell data, our Non-spreadsheet cell (external data) and user inputs. Therein, lies an opportunity to allow users to create normal spreadsheet cell formula calculations that are easily changeable through single or multiple value picklist inputs, that can do a much broader spectrum of calculations than can be done today with changeable multi-value inputs and are fed by very simple to create picklists.

Our technology makes it easy for users to create sorted and deduped picklists usable in regular cell formulas. Picklists that can hold more than one value in a regular spreadsheet cell and be used by our technology spreadsheet functions with no change to how those functions are used by users. Using this for cell data, our Non-spreadsheet cell (external data) and user inputs.

SUMMARY

The technology disclosed relates to accessing data within or external to spreadsheet cells (NSC data) and presenting it to users, so they can select one or more value to populate the cell. In one implementation, the technology disclosed is a spreadsheet function (predefined formula) where the user inputs a cell range or NSC data formula source list resulting in a button operated drop-down (pop-up or other visual) populating one value within the cell. Once the formula is completed the user can change that value by clicking the button and selecting the desired value from the multiple values picklist presented. In another implementation the function input can be altered to add a constraint (filter) limiting the picklist values presented for selection. In variants of any of the implementations, the presented values can be organized in ascending or descending orders for easy selection and show all values or only the unique (distinct) values. These implementations populate the cell with a value (including a blank or a null value as dictated by the data or constraints) that can be used just like any other value within the spreadsheet.

In another implementation, the technology disclosed is a spreadsheet function (predefined formula) where the user inputs a cell range or NSC data source list formula resulting in a button operated pop-up (or other visual) populating multiple values within the cell. Once the formula is completed the user can change that the value or values populated in the cell by clicking the button and selecting the desired value or values from the multiple values picklist presented. In another implementation the function input can be altered to add a constraint (filter) limiting the values presented for selection. In variants of any of the implementations, the presented values can be organized in ascending or descending orders for easy selection and show all values or only the unique (distinct) values. Another embodiment of this technology supports cells set equal to a multi-value drop-down, pop-up or other visual cell which mirrors the value(s) in the original cell but does not allow changing of the value(s). These implementations populate a cell with multiple values that can then be used as an input into our spreadsheet NSC data formulas and our functions that can accept and use multiple values from a single cell. In these embodiments those functions are versions of existing spreadsheet functions altered to accept and use multiple values from a single cell. One embodiment of those functions requires no changes in the function syntax/arguments, versus the regular functions, thereby making their use more straightforward for users.

Particular aspects of the technology disclosed are described in the claims, specification and drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee. The color drawings also may be available in PAIR via the Supplemental Content tab.

The included drawings are for illustrative purposes and serve only to provide examples of possible structures and process operations for one or more implementations of this disclosure. These drawings in no way limit any changes in form and detail that may be made by one skilled in the art without departing from the spirit and scope of this disclosure. A more complete understanding of the subject matter may be derived by referring to the detailed description and claims when considered in conjunction with the following figures, wherein like reference numbers refer to similar elements throughout the figures.

FIG. 1, FIG. 2 and FIG. 3 shows steps required to create an in-cell dropdown in Microsoft Excel FIG. 4 examples a Microsoft Excel in-cell dropdown relative to its source data.

FIG. 5, FIG. 6 and FIG. 7 shows steps required to create an in-cell dropdown in Google Sheets.

FIG. 16A, FIG. 16B and FIG. 16C example an appearance and use of our multi value in-cell pop-up for a single value selection.

Figures 24A, 24B, 24C, 24D:
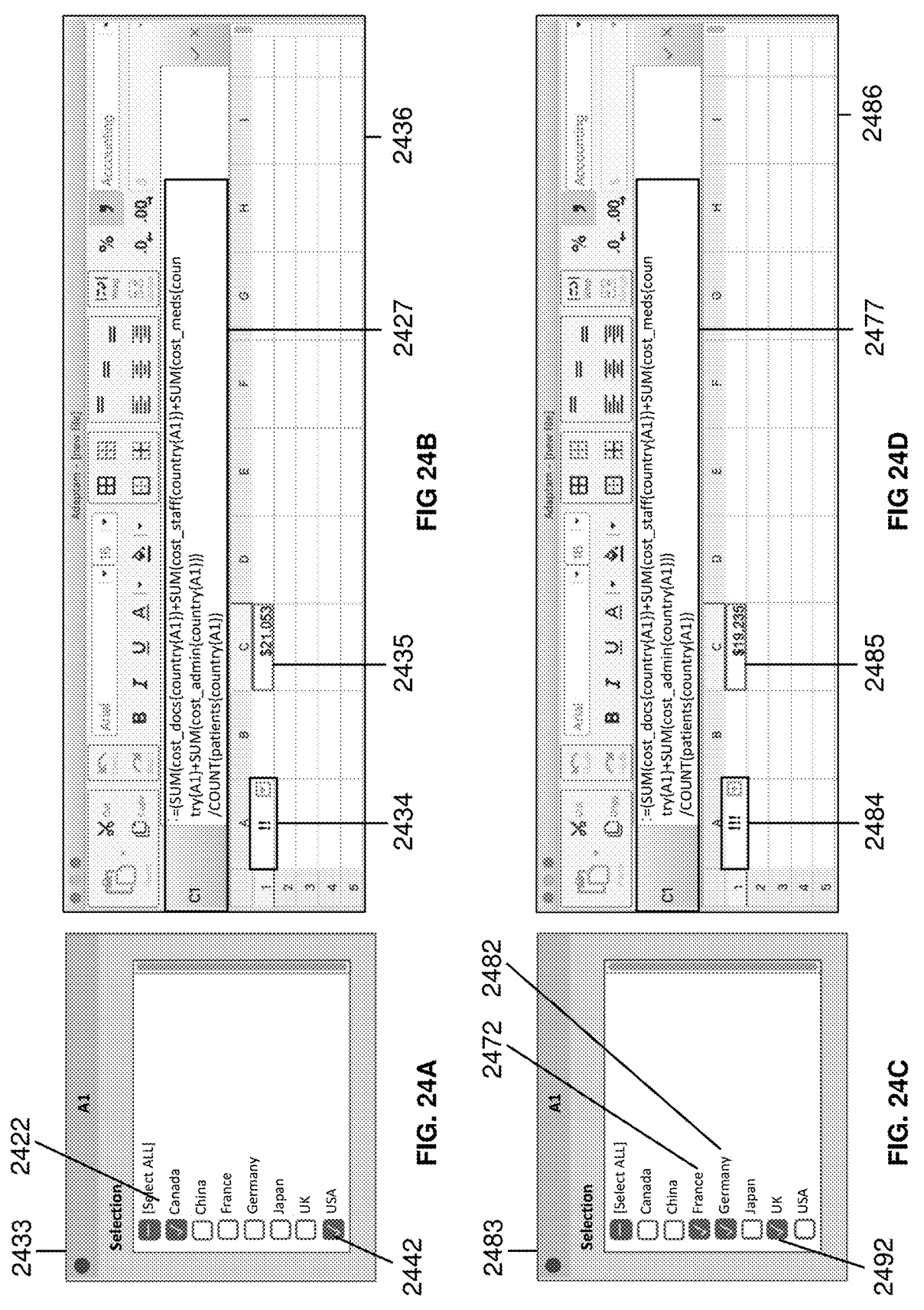

FIG. 24A, FIG. 24B, FIG. 24C and FIG. 24D examples the use of multiple value in-cell inputs in multi-function formulas and the ease of changes.

FIG. 25 gives examples of existing spreadsheet functions our technology converts to accept multiple values from a spreadsheet cell.

FIG. 27 depicts an example computer system that can be used to implement aspects of the technology disclosed.

DETAILED DESCRIPTION

Figure 4:
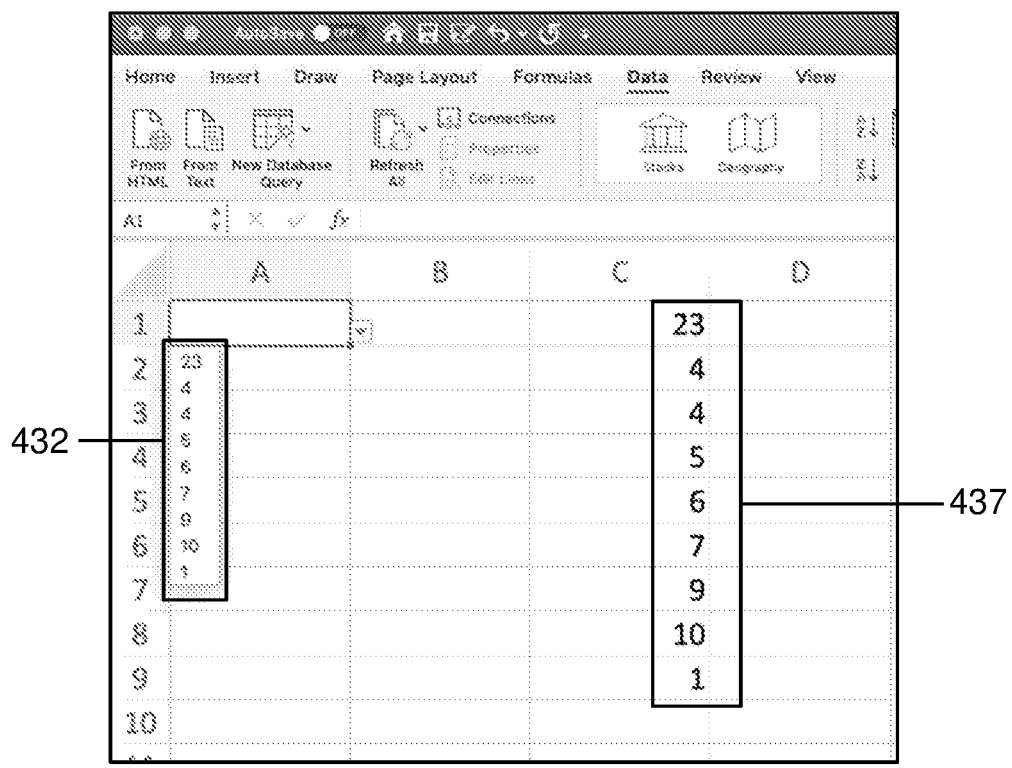

The following detailed description is made with reference to the figures. Example implementations are described to illustrate the technology disclosed, not to limit its scope, which is defined by the claims. Those of ordinary skill in the art will recognize a variety of equivalent variations on the description that follows.

When spreadsheet applications were first created, they electronically emulated tabular paper spreadsheets. More recently, Microsoft Excel, Google Sheets, Apple Numbers and others have dramatically increased the breadth of capabilities and usefulness of spreadsheets. Spreadsheet applications now access data across a wide variety of sources including relational, structured and semi-structured, open data protocol (OData), Web and Hadoop among others; and these applications manipulate data—such as in pivot tables and via Microsoft PowerPivot. Additionally, spreadsheets have extensive functionality for creating charts with SmartArt and for building forms, and they even have programming languages embedded within them, such as Visual Basic (VBA in Excel), Apps Script (in Google Sheets) and Apple Script (in Numbers).

With all the added capabilities, spreadsheet applications have become substantially more complicated. The data manipulation and embedded programming language capabilities can be very powerful but are complicated to learn and therefore they are used by a very small fraction of the spreadsheet application user base. All this complexity has led to over a hundred books and thousands of online videos that have been published to help users understand the capabilities of Excel alone.

Spreadsheet providers like Microsoft Excel and Google Sheets cater to the specialized needs of users through many capabilities including vast numbers of spreadsheet functions (e.g., built in predefined formulas including SUM, COUNT and MIN). Microsoft Excel includes more than four hundred and fifty built-in functions and Google Sheets over four hundred. These built-in functions make operations desired by users dramatically simpler.

The formulaically defined non-spreadsheet cell (NSC) data variables and related technologies disclosed in "Methods and Systems for Connecting a Spreadsheet to External Data Sources with Formulaic Specification of Data Retrieval" filed previously, allow users to work with all types of numeric and text external data sets much larger and more complex than can currently fit in traditional spreadsheets. This external data connection creates the foundation for users to automate spreadsheet work without the use of embedded programming languages or special prebuilt data feeds, taking spreadsheets from a tool users employ to conduct one off or routine analytics to a real-time competitor of systems that automate repetitive activities.

The disclosed technology allows users to very easily create within their spreadsheet drop-down, pop-up or other visual cells which present ordered data sets from cell data sets or external data sets using our NSC data variables exploiting identified data hierarchies or finding their own relationships. These ordered data sets can be used to select and populate one or more than one value within a spreadsheet cell. The technology makes it easier for users to create and use those drop-down or pop-up cells. Some implementations of it allows users to see data values that are not stored in any spreadsheet cell and to select and populate multiple values within a regular spreadsheet cell for use by spreadsheet formulas, functions and calculations. All the implementations of the disclosed technology make it easy for users, who did not create the spreadsheet and are not familiar with the spreadsheet or the data it uses, to employ the formulas and data within the spreadsheet.

Limitations of Existing Technologies

Both of the leading spreadsheets, Microsoft Excel and Google Sheets, support users creating drop downs directly in their application and creating pop-ups via programming with their imbedded programming languages, VBA and Apps Script respectively. However, to create a dropdown in either of those spreadsheets takes numerous steps (actions) and presents results that do not organize the data in ways to make it easy for users to then find and select the value they desire. They also do not work for data that does not reside within cells within the spreadsheet and are not created through the simplicity of a spreadsheet function.

Given Microsoft Excel is the most used spreadsheet in the world, we first example the relatively cumbersome steps required to create a dropdown for data stored elsewhere in spreadsheet cells taken from a Microsoft website. FIGS. 1, 2 and 3 layout the ten steps (activities) that it takes to create an Excel dropdown once you have the data residing within your spreadsheet. These activities involve moving from the Excel Home ribbon to the Data ribbon and then selecting the Data validation 176 (FIG. 1) button. Making selections in multiple pop-ups 223 (FIG. 2) and 273 and deciding what error you want if users enter invalid data 323 (FIG. 3). If the data does not reside within your spreadsheet, as embodiments of our technology include, then three very time-consuming steps are added to the ten steps shown in FIGS. 1, 2 and 3. Those three additional steps are 1) going to your institutions technical personnel and asking them to find the data, 2) having those people write a query to create a file with the data and then download the data to somewhere you can access it, and 3) you importing that data into your spreadsheet. The end result, of creating the in-cell drop-down, is a list 432 (FIG. 4) which exactly replicates the data from which it was sourced 437 with no organizational order (ascending or descending) and no removal of duplicate values (i.e., the duplication of 4 in the drop-down list 432) to make it easier to find the values the user wants—both of which are hugely important in easily finding the value desired in long lists. So, creating an in-cell drop-down list in Excel is not an easy process and does not yield an easily usable outcome.

Figure 8:
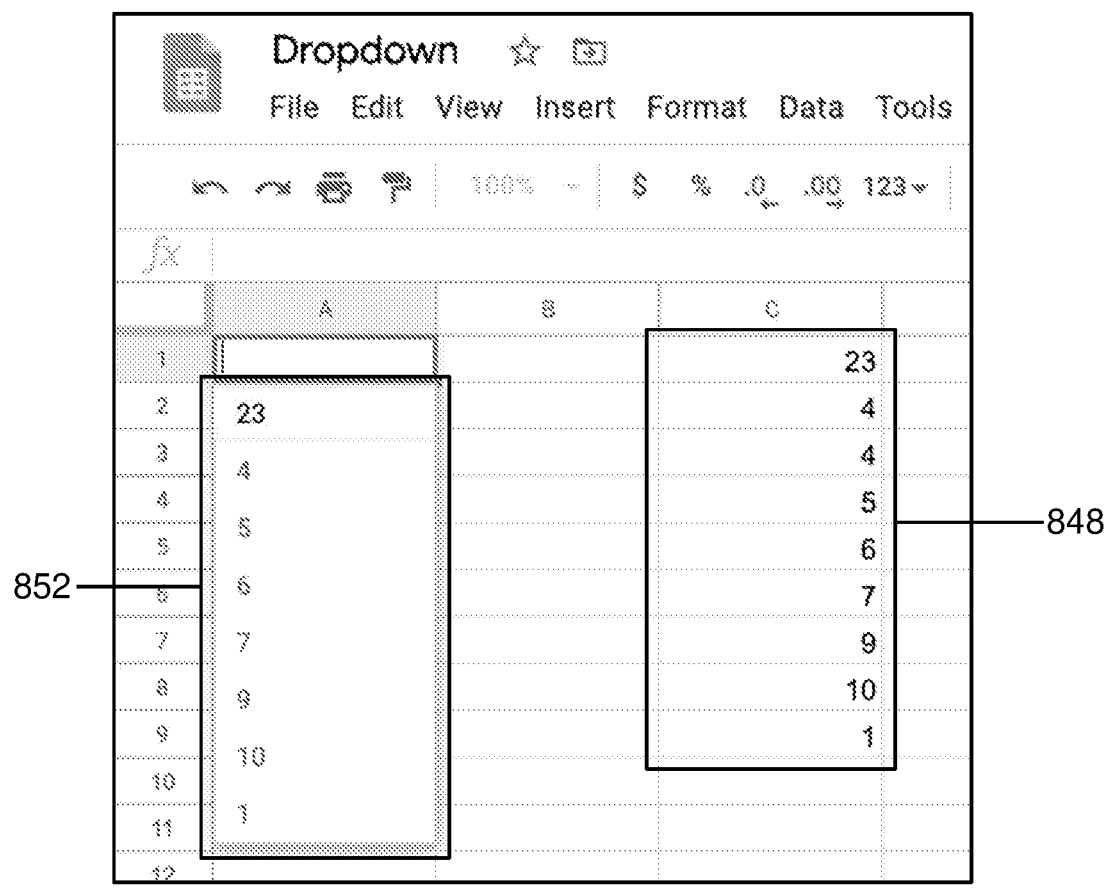
FIG. 8 examples a Google Sheets in-cell dropdown relative to its source data.

Creating an in-cell drop-down in Google Sheets from external data requires twelve steps (activities). FIGS. 5, 6 and 7 lays out those twelve steps where the user needs to go to menu 534 (FIG. 5) and make decisions in a drop-down 554, take two actions in the data validation pop-up 583 (action one), 623 (action two in FIG. 6). Then get a new range pop-up 643 where users take two actions, 672 (action one) and 693 (action two), to select the desired data range to use. Users now return to the data validation pop-up 724 (FIG. 7), then click the Reject input selector 743 and then click the Save button 785. This gets the user the in-cell drop-down 792 with no value shown. Unlike Excel, the Google Sheets in-cell dropdown list 852 in FIG. 8 does remove duplicate values in the drop-down (i.e., no duplicate 4 in the drop-down list 852) from the source cell data 848. However, like Excel, Google Sheets does no organizational order (ascending or descending) and therefore makes it very difficult for users to find the value they desire if the list is long. Like Excel, Google Sheets has no capability to create an in-cell dropdown from data that does not reside within its spreadsheet cells. Neither Microsoft Excel nor Google Sheets has a facility for creating an in-cell pop-up without reverting to their imbedded programming languages, VBA and Apps Script—which few users know and use. Neither spreadsheet has a facility for storing and then making available for use by spreadsheet formulas and functions multiple values stored within a regular spreadsheet cell. Neither app has an easy way for users to create an in-cell drop-down or pop-up with a search capability that helps users easily identify the values they would like to select in that drop-down or pop-up. The other spreadsheets (e.g., LibreOffice and Zoho sheets) use a similar Data menu to Data validation and pop-ups approach to Excel and Google Sheets, with the exception of Apple numbers which has a more limited set of capabilities with a different menu setup and set of actions. As a result, none of these spreadsheets allows users to easily create highly functional in-cell drop-downs or pop-ups. None of them allows users to create a cell that holds more than one value and supports use of more than one value from a referenced cell in range functions such as SUM, MIN, MAX or AVERAGE.

Single Value In-Cell Dropdown, Pop-Up or Similar Visual

Figure 9A:
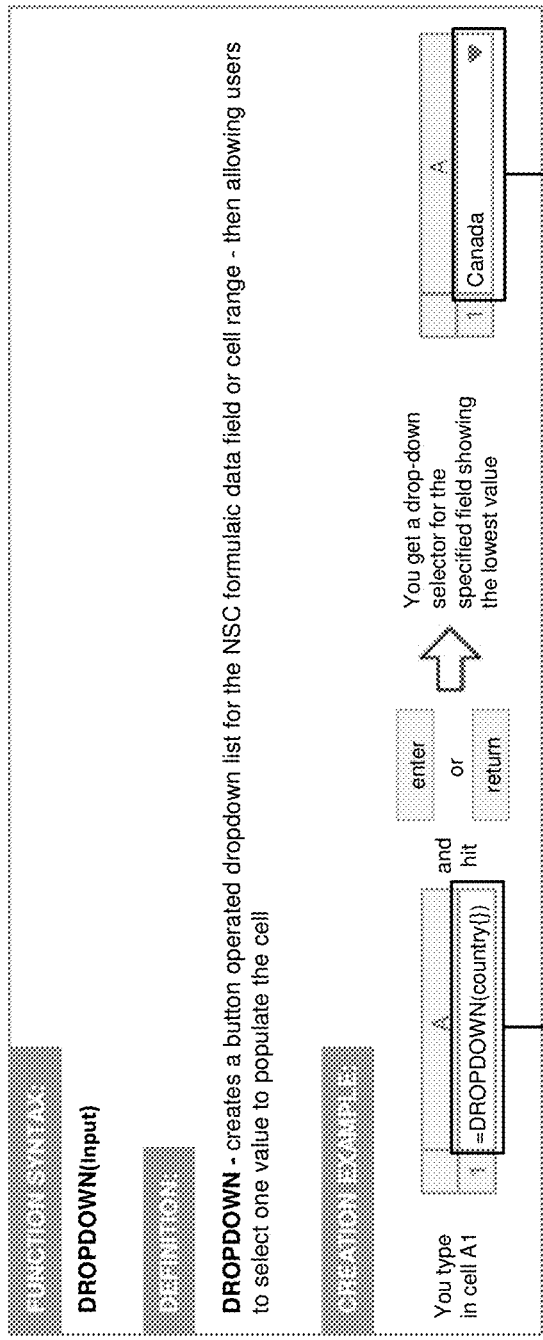
FIG. 9A and FIG. 9B examples our single value in-cell dropdown Function using our Non-spreadsheet Cell (NSC) formulaic data—illustrating its syntax (arguments), definition, a creation example and a usage example.

In contrast to many step processes, used in the existing spreadsheets to create an in-cell drop-down, our technology employs new functions (predefined formulas) to deliver an in-cell drop-down or pop-up by filling out a single function formula. In one embodiment of our technology, shown in FIG. 9A, creating an in-cell dropdown 958 from data not stored in the spreadsheet is as simple as writing the formula 953:

=DROPDOWN(country{ })

and hitting enter (PC) or return (Mac). In this embodiment the cell is then populated with the A to Z sorted lowest value of the NSC formulaic data field country—'Canada' 983. It could have shown the A to Z sorted highest value, a blank, a select an input or some other value or message until a selection is made.

Figure 9B:
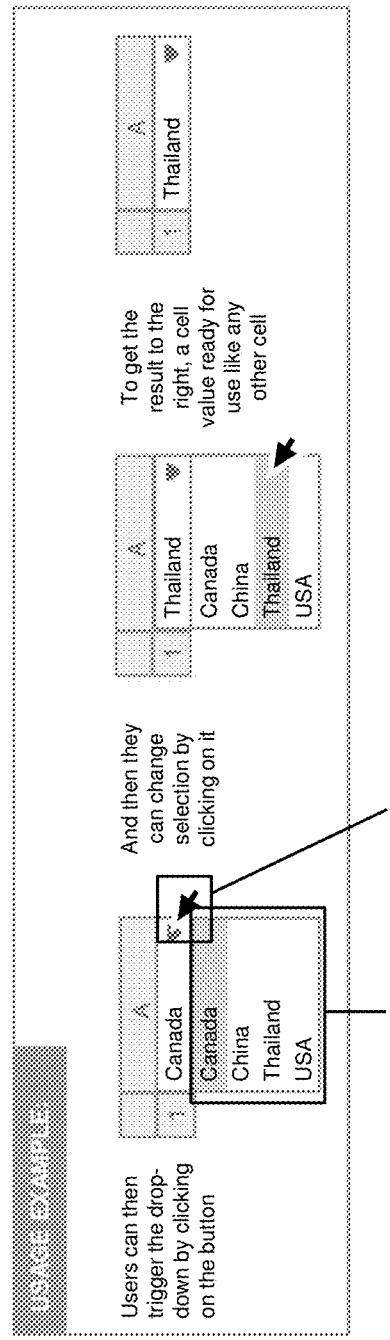

FIG. 9B examples the operation of the dropdown where the content has been organized A to Z ascending (similarly ascending for alphanumerics, numbers, or dates) and where all duplicated values have been removed to give an organized unique (distinct) picklist that is easier for users to select from. Our DROPDOWN Function (predefined formula) is automatically executing all the activities exampled in FIG. 10. The automatic execution starts by retrieving the all the data for the NSC formulaic data field 'country', which is this example has eleven values 1042—but in other situations using our technology could have numbers of values ranging well above ten million. In this embodiment it then sorts the data lowest to highest, which for text means A to Z as shown in the sorted data set 1044. This is done to organize the picklist for easy review by a user trying to find a particular value. Next our technology eliminates duplicates to give just the unique (distinct) values 1036, done to make the picklist shorter and more manageable for use by users. Finally, it returns the lowest value, 'Canada' 1028, which will be visible in the cell and the entire list 1036 will be visible and selectable by a user clicking on the drop-down (in this embodiment clicking on the triangle 974 in FIG. 9B within the DROPDOWN populated cell). In this embodiment, to keep it very simple for setup and usage, a user selects the value they want from the list with no option to type values into the dropdown thereby eliminating potential errors by users typing values that do not exist in the list.

Figure 10:
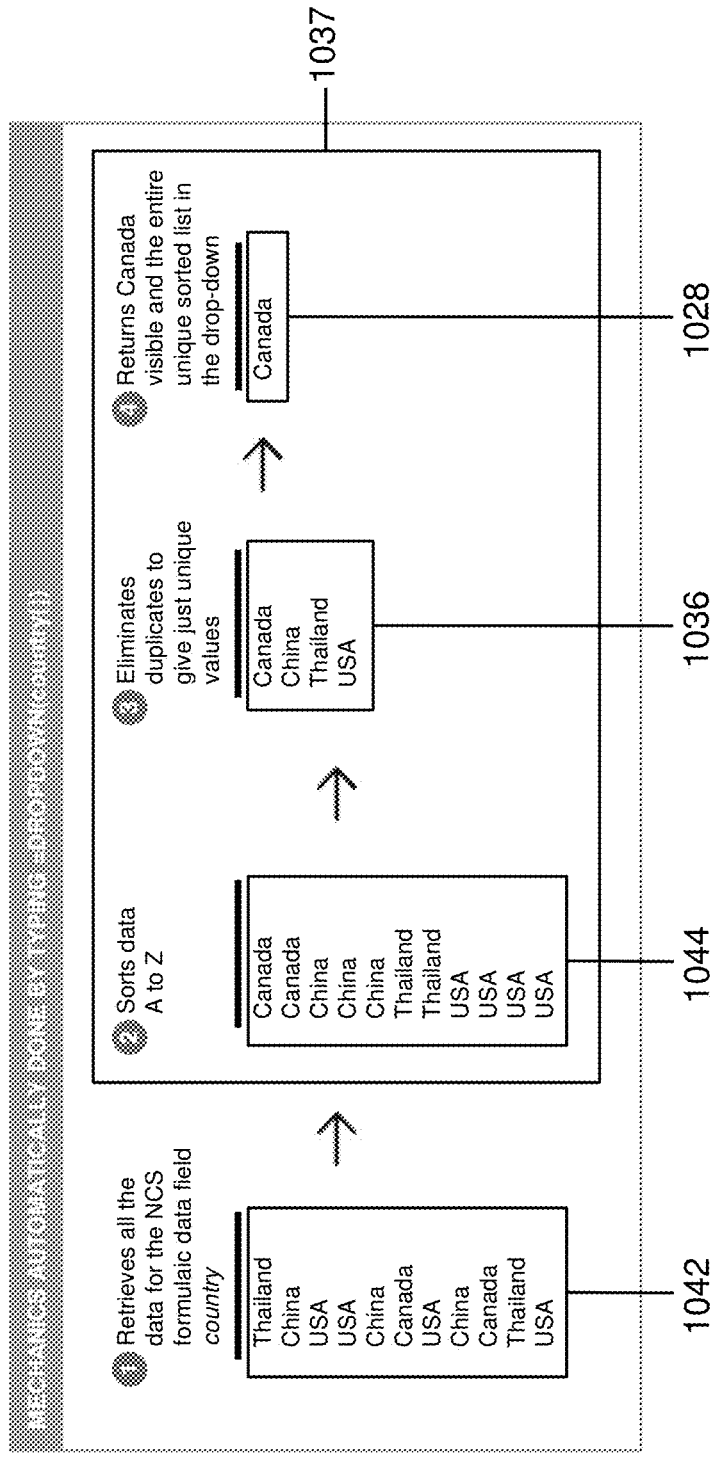
FIG. 10 illustrates the mechanics automatically done by our single value in-cell dropdown Function in FIG. 9A.
Figure 11:
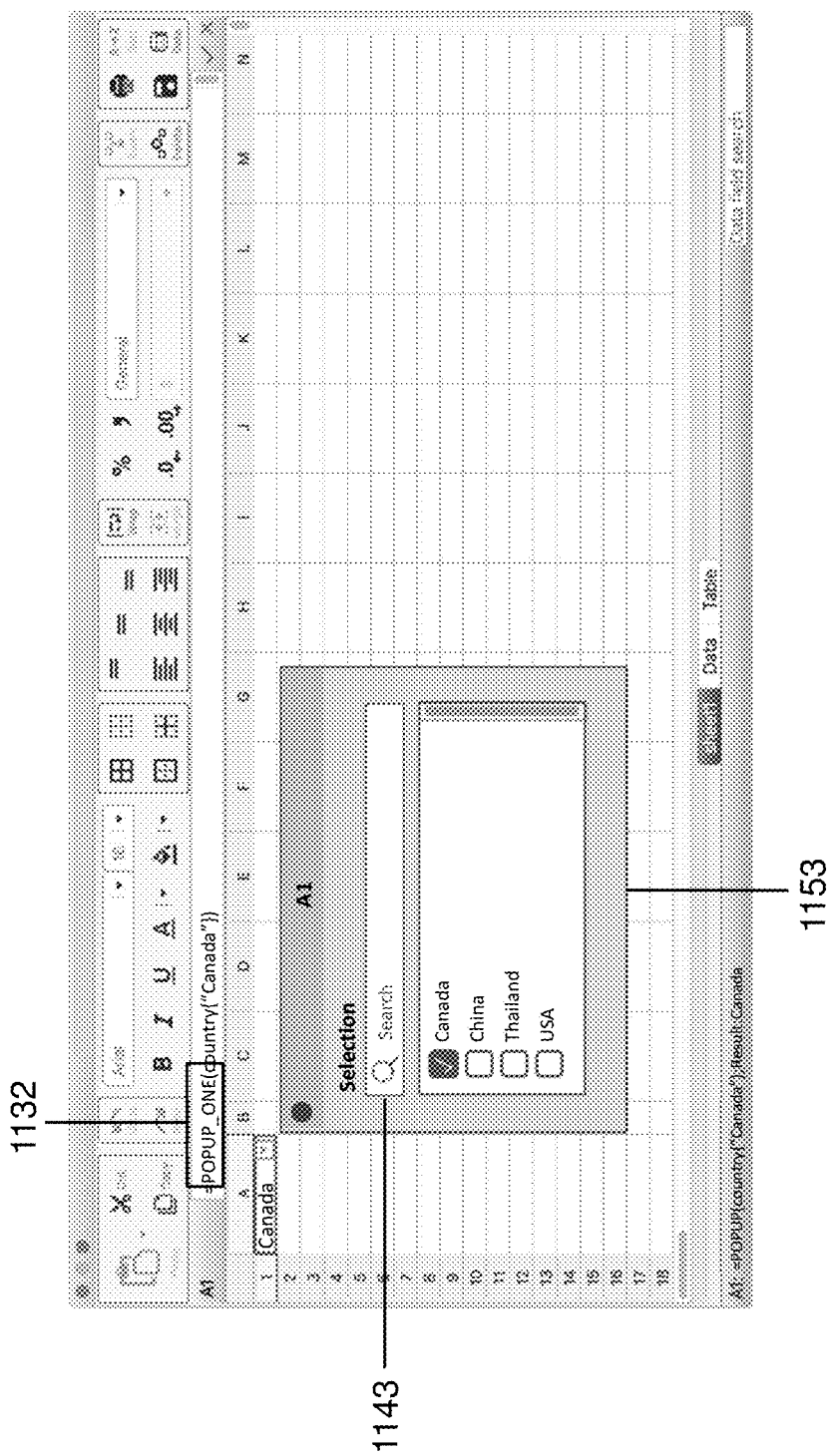
FIG. 11 examples our single value in-cell pop-up Function with a Search capability.

In another embodiment, shown in FIG. 11, the same automatic execution activities exampled in FIG. 10 could be used for a pop-up 1153 having an added Search capability 1143. In this embodiment that function is named 'POP-UP_ONE' 1132, because it is a pop-up that allows the selection of one value. However, it could be named many ways. Its search capability would be particularly helpful in very large data sets which have hundreds or more of the unique (distinct) values for the specified data set. Like the previous embodiment, the user can type something into the search bar but ultimately selects the value or values they want from the list, which will be very familiar to users as it is how the pop-ups in Microsoft Excel tables or Google Sheets filters work. Although those pop-ups are not available in those spreadsheets for use by regular cell reference feeding regular cell calculations and are only available for use other usages such as filters in tables or pivot tables.

Figures 12A, 12B:
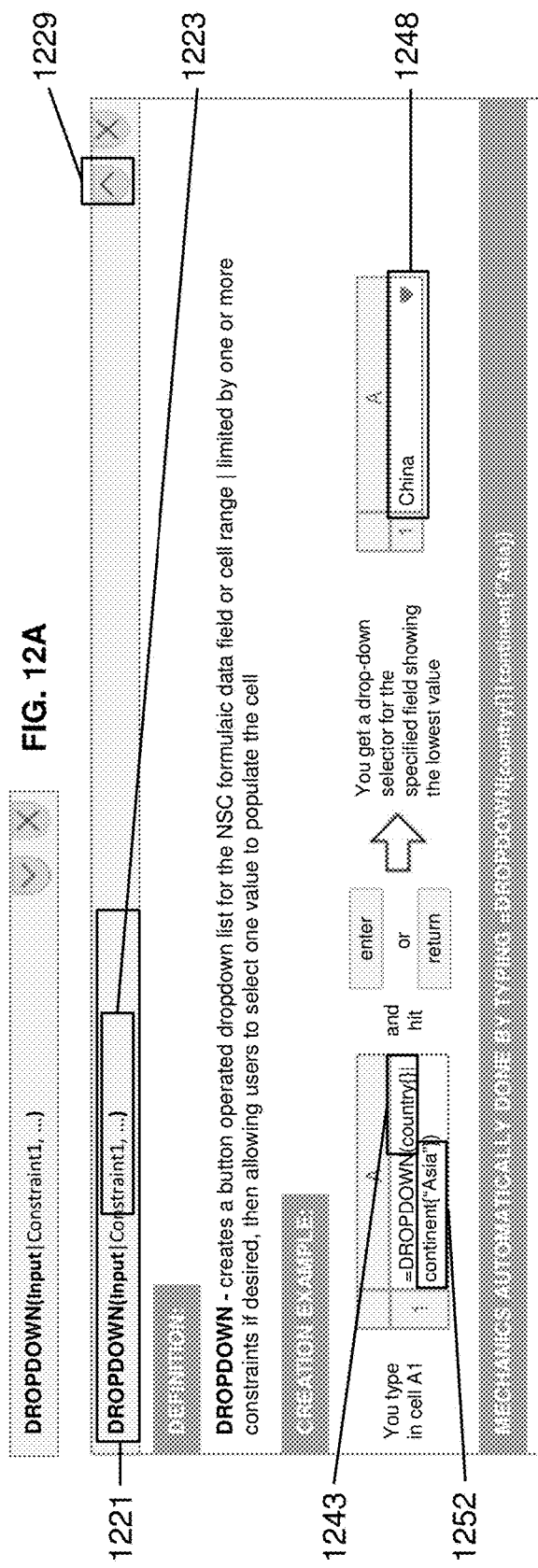
FIG. 12A and FIG. 12B examples our single value in-cell dropdown Function with a constraint (filter) using our NSC formulaic data—illustrating its syntax (arguments), definition, creation example, and the mechanics automatically done. And illustrates a short form and a longer example form of the usage hint pop-ups typically provided to users for spreadsheet functions.

In another embodiment, FIG. 12B shows how a constraint can be added to our in-cell drop-down or pop-up Function technology to easily add capabilities. This allows user to constrain the values shown and selectable within the in-cell dropdown or pop-up, such as constraining (filtering) the values of the NSC formulaic data field country—in this embodiment shown as 'country{ }' 1243—to only those values with the continent value of "Asia"—shown as continent{"Asia"} 1252. Thus, cell A1 is populated with 'China' 1248 and both 'China' and 'Thailand' 1277 would be visible in the drop-down once it was opened as selection options. In this embodiment the constraint is added using an optional argument within the function formula. Specifically, in this embodiment, the non-bolded parts "|Constraint1, . . . " 1223 of the Function Syntax and argument structure 1221 allows the user to use or not use a constraint and to add as many constraints as they would like.

FIG. 12A and FIG. 12B examples another advantage for users of creating dropdowns, pop-ups or other visuals via a spreadsheet function using our technology—that being the simple function syntax and argument structure help hint FIG. 12A or the more complete hint FIG. 12B which aids users creating the function. Microsoft Excel uses the very minimalistic hints that pop up after you select or type the function in a formula and FIG. 12A examples how that might look. In this embodiment, through the bolding, the hint lets users know that they must fill in the 'Input' and through the lack of bolding tells the user adding a 'Constraint1' and additional constraints (filters) is optional. FIG. 12B examples the more extensive help hints patterned after those found in Google Sheets with the option like in Google sheets to collapse those down, via the arrow button 1229, to the minimalistic version shown in FIG. 12A. This automatically helps the user of this function to remember how to use them without having to do any Help or internet hunting (such as that shown in FIG. 1 through FIG. 3 for the Microsoft Excel dropdown setup user interface). Using function names (e.g., DROPDOWN or POPUP) that are highly descriptive of what they will get also helps users remember the functions like they remember SUM or COUNT. All combining to make it extremely easy for users to create dropdowns, pop-ups or other similar visuals in complicated constrained situations.

The ability to apply constraints to the in-cell drop-down, pop-up or other visual values makes them very easily customizable. In the example in FIG. 12B the in-cell drop-down or pop-up would only display two values 1277 in the drop-down or pop-up. The input of 'continent{"Asia"}' 1252 was typed into the in-cell drop-down or pop-up Functional formula, however input of '"Asia"' could be replaced by a cell input in the NSC formulaic data field 'continent { }' allowing a user to easily alter the value without touching the Function formula by simply changing the value in the referenced cell. That cell input could also be another in-cell drop-down or pop-up, as in this example it would make sense for that to be an in-cell drop-down or pop-up for continent. Thereby allowing a user not familiar with the data to see all the options they have first for continent and then for the continent constrained set of countries. This embodiment also allows more than one constraint to be inputted, creating many possible inputs and usages.

Figure 13:
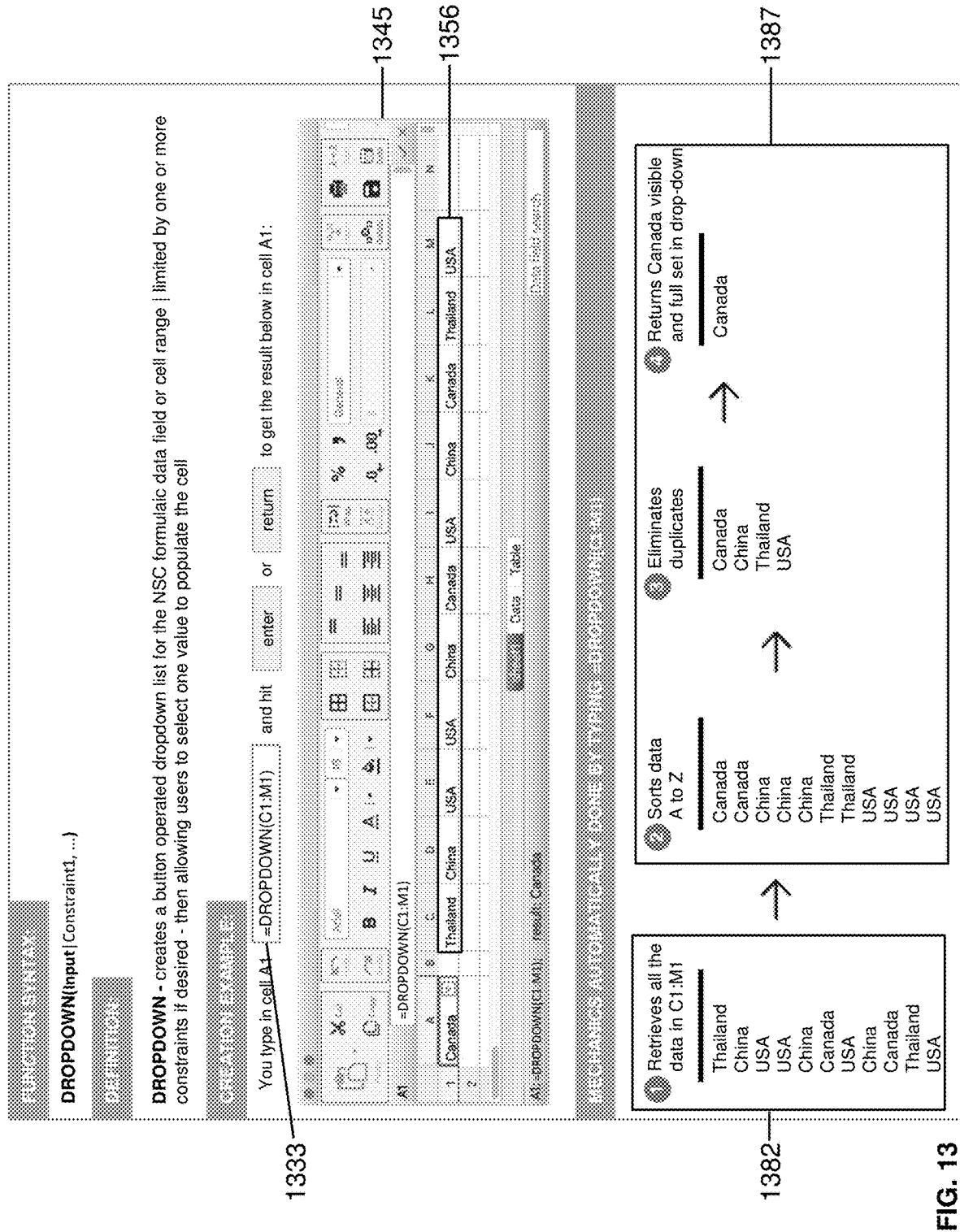
FIG. 13 examples our single value in-cell dropdown Function using in-cell data—illustrating its syntax (arguments), definition, creation example, and mechanics automatically done.

As FIG. 13 examples, our technology also works for inputs of cell data anywhere accessible within the spreadsheet worksheet tabs. In our technology there is no need to change the syntax/arguments of the in-cell drop-down or pop-up function as in this embodiment it accommodates NSC formulaic data field or cell range inputs. FIG. 13 examples the same data set as the NSC data used in FIG. 9A and outcome in FIG. 10 instead populated in spreadsheet cell and used as shown in the formula 1333:

=DROPDOWN(C1:M1)

using the cell range 1356 shown in the spreadsheet 1345. That cell range could have been anywhere including on a different worksheet tab. Once the data is retrieved from the cells 1382 the rest of the automatically executed activities 1387 are the same as those activities 1037 done in FIG. 10 for the same data which was not in the spreadsheet cells but was retrieved by our NSC formulaic data field.

Users can also directly enter the data into our technology. In this embodiment our technology will then sort from lowest to highest (A to Z in this example) and make the values unique (distinct). So, if the user types the formula below into a cell:

=DROPDOWN(Germany, France, Spain, Italy, Greece, Belgium, UK, Austria, UK, Netherlands)

They will then get a dropdown (although the same would be true for a pop-up or other visual) displaying the countries ordered—Austria, Belgium, France, Germany, Greece, Italy, Netherlands, Spain, UK—with in this embodiment the first value of Austria showing up as the default selection until the user selects a different value. This embodiment requires one small change to the previously used formula syntax/arguments 1221 in FIG. 12B, adding the option of multiple inputs as shown in 1423 in FIG. 14. This also gives the user the opportunity to use multiple cell ranges which will work in our technology. And while direct entry does not use a constraint, the constraint inputs are optional and therefore its usage is compatible with this embodiment and makes it much simpler for users to have one function syntax that covers all the alternatives desired. In our technology users can then modify the list by simply adding additional inputs or removing inputs and should they then duplicate an inputted value our technology would dedupe that duplicate value as it puts it into order. The selection process using the picklist would operate as previously exampled in FIG. 9B or as modified by the UI in FIG. 11.

Figure 14:
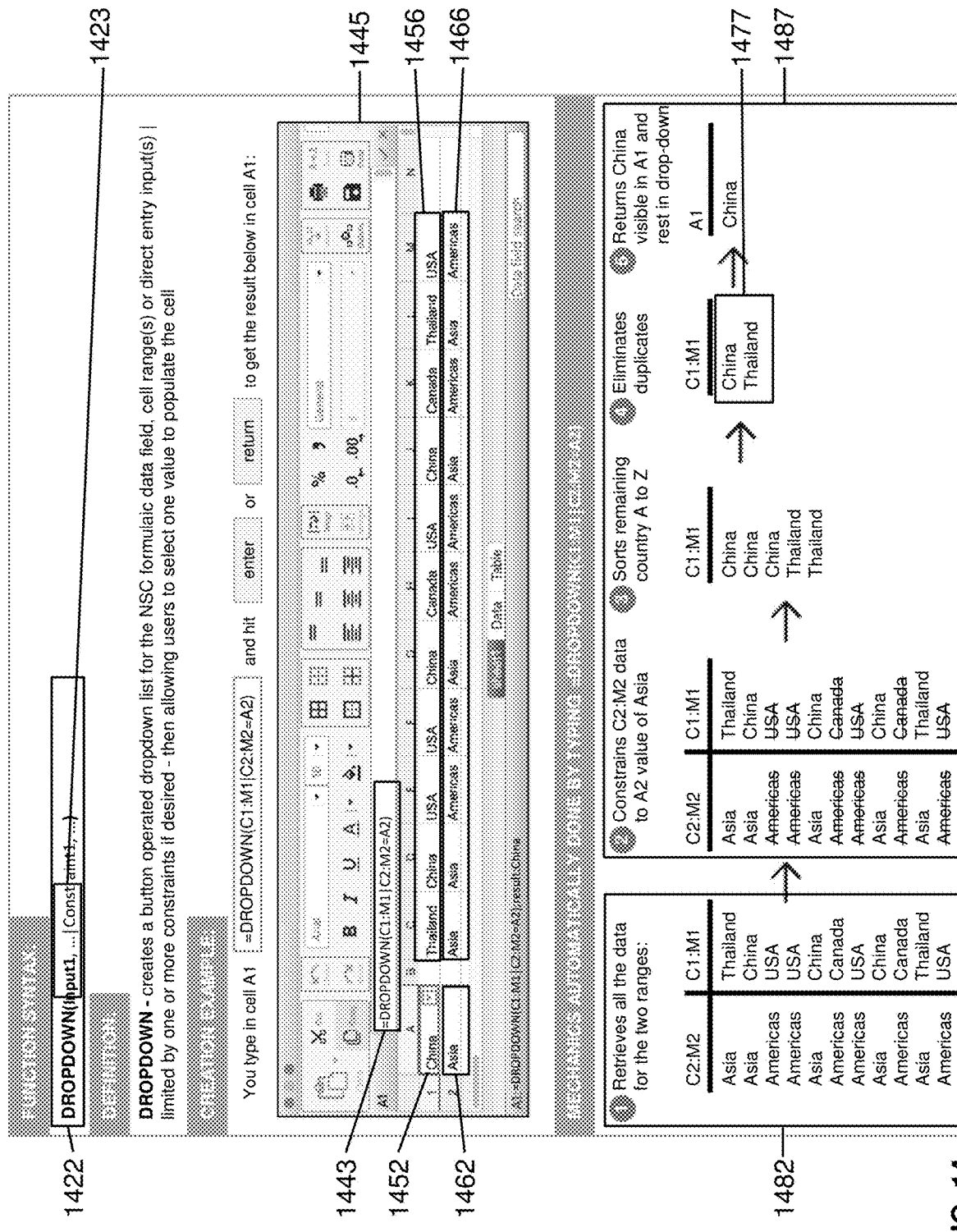
FIG. 14 examples our single value in-cell dropdown Function using in-cell data with a constraint (filter)—illustrating its syntax (arguments), definition, a creation example, and the mechanics automatically done.

FIG. 14 examples how our technology applies to cell inputs including constraints. Other embodiments could change the in-cell drop-down, pop-up or other visual Function syntax/arguments 1422 across the input of NSC formulaic data, the input of cell values and direct value inputs, however this embodiment requires no such change and works for all types of data input. In this example cell A1 1452 holds the formula 1443:

=DROPDOWN(C1:M1|C2:M2=A2)

which uses the cell range 'C1:M1' 1456 for the input, and the cell range 'C2:M2' 1466 and the cell 'A2' 1462 as the constraint—as shown in the spreadsheet 1445. In this embodiment the constraint range 'C2:M2' 1466 is tested for values equal to the value 'Asia' in 'A2' 1462. That constraint (filter) could have been >A2, <A2, >=A2, <=A2 or < >A2 and its syntax could have been made more similar to our formulaic data by the use of the curly braces—e.g., C2:M2{=A2} or an abbreviated form C2:M2 {A2}. Other syntaxes could be used setting up the constraint (filter), that are not as consistent with our NSC formulaic syntax. As before, the referenced cell ranges could have been anywhere in the spreadsheet and have no need to be near the in-cell dropdown, pop-up or other visual. Once the data is retrieved from the cells 1482 the rest of the automatically executed activities 1487 are the same as those done in FIG. 12 1287 accounting for the different data sources. It gives the same result of 'China' in A1 1462 and 'China' and 'Thailand' 1477 as the values that would show up in the dropdown picklist once it is opened.

Further embodiments of our technology would alter the organizational approaches to order and display the dropdown, pop-up or other visual results, so they are descending or sort on cell colors or other custom factors. In some situations, users may want to see all the values rather than just the unique (distinct) values. This can be achieved by an EVERY (or similar descriptor) variant of the Function or adding another optional element into the syntax of the Function specifying EVERY value would be shown in the syntax as exampled below:

DROPDOWN(Input|Constraint1, . . . |EVERY)

Where in this embodiment the bolded parts are required and the non-bolded "|Constraint1, . . . |EVERY" are optional at the users' discretion. In the Function syntax/argument help it would be explained that if the EVERY is used in writing the Functional formula the user would get an ordered set of every value in the data set with no removal of duplicates.

Multi-Value In-Cell Drop-Down, Pop-Up or other Visual

Our spreadsheet technology is not limited to containing a single value in a cell but can contain multiple values for use by formulas referencing that cell and can display the multi-values within the formula bar, within the cell, within in-cell pop-ups and/or within other in-cell visualizations. This opens up many capabilities for users to create formulas that are easily changed to calculate values for different combinations of inputs. Spreadsheet users no longer need to set up Pivot Tables to create easily changeable multi-value calculations. As well as users are no longer limited to the small set of functions available in the current spreadsheet Pivot Tables and the inability to build any formula they would like with as many functions and math operators as they would like with multi-value inputs. Our technology allows users to transform regular formulas into formulas that can readily take multi-value inputs and therefore do calculations not readily possible in regular spreadsheet cells.

Figure 15:
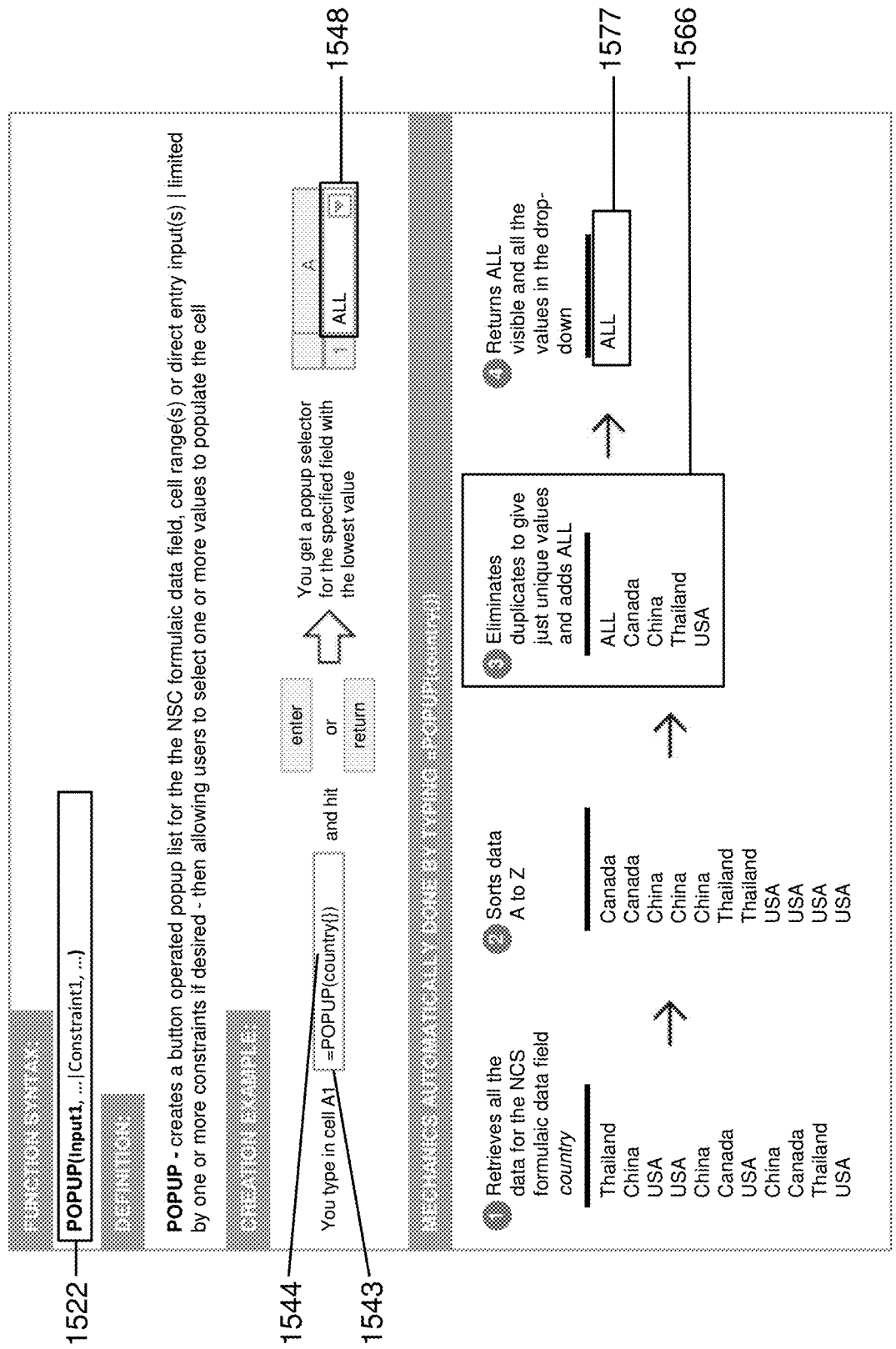
FIG. 15 examples our multi-value in-cell pop-up Function using our NSC formulaic data, illustrating its syntax (arguments), definition, a creation example, and the mechanics automatically done.

FIG. 15 examples one embodiment of our technology uses the same syntax/arguments 1522 as many of the previous embodiments with a different Function name—in this case 'POPUP'. When the user types the formula 1543:

=POPUP(country{ })

In cell A1 they get an in-cell pop-up displaying the lowest value of the formulaic data descriptor field 'country{ }' 1544 showing the value 'ALL' with a pop-up button in cell 'A1' 1548. The activities automatically executed by this Function 1543 are the same as those in done in FIG. 10 until the $3^{rd}$ step 1566 inserts a value of 'ALL', in this embodiment, into the lowest (first) A to Z sorted position. Note in this embodiment had the county Afghanistan been in the picklist 'ALL' would precede it or any other value in the lowest or first position in the picklist. Then in this embodiment the lowest or first value is the default value returned when the formula is written, which is 'ALL' 1577 that is shown in the cell 'A1' 1548 (of course that value can then be changed by user selection from the list shown in 1566). And, like we discussed before. the default selection when setting up the formula could be another value (e.g. the highest value in this case 'USA') or it could be an instruction for the user to select a value. The ALL option could be shown in a number of different ways, e.g., !ALL, (ALL), or (all values), to let the user know that instead of a single value any formula referencing this cell will receive all of the values contained.

FIG. 16A then examples one embodiment of how the in-cell pop-up 1634 looks when the user clicks on the button 1623 in cell 'A1' 1622. It also examples one embodiment of how the formula bar 1613 displays the formula and value of 'ALL', in this case using a formula syntax of '!ALL', which is a variant of a syntax convention exampled in our previous patent applications for our formulaic data retrievers. Changing selections in the in-cell generated pop-up allows a user to select one or more value. In FIG. 16B the user selects one value 'Thailand' 1682 in the pop-up 1673, which then gives the result within cell A1 1687 shown in the spreadsheet worksheet in FIG. 16C. In this embodiment the value Thailand is automatically shown within double quotes "Thailand" 1678 within the Formula bar as well as shown in the cell A1 1687 as 'Thailand'. In this embodiment it is also shown both ways in the Status bar 1698 that shows the calculation, the result and any error detail (in the event of an error) at the bottom of the spreadsheet.

Figure 17A:
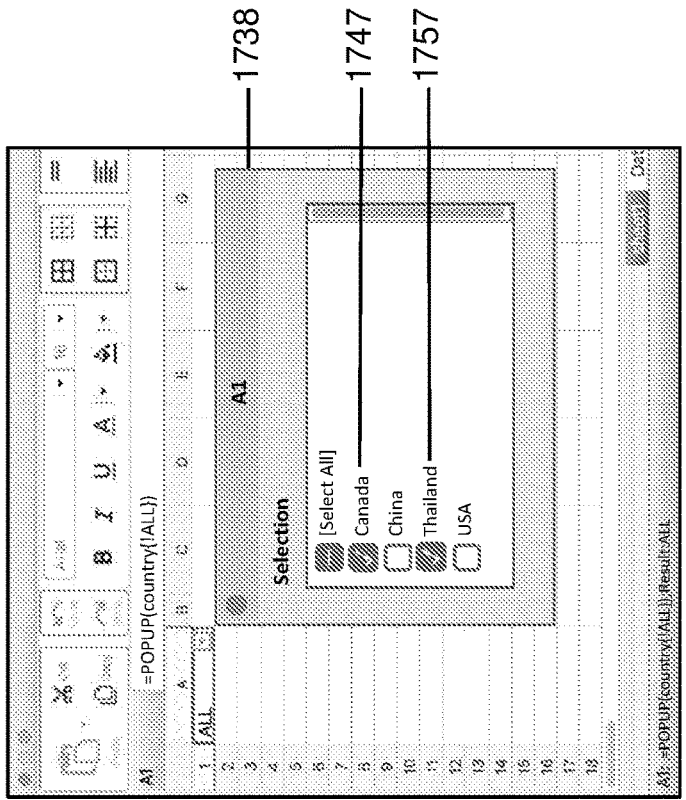
FIG. 17A, FIG. 17B and FIG. 17C example an appearance and use of our multi value in-cell pop-up for a multiple value selection.
Figure 17B:
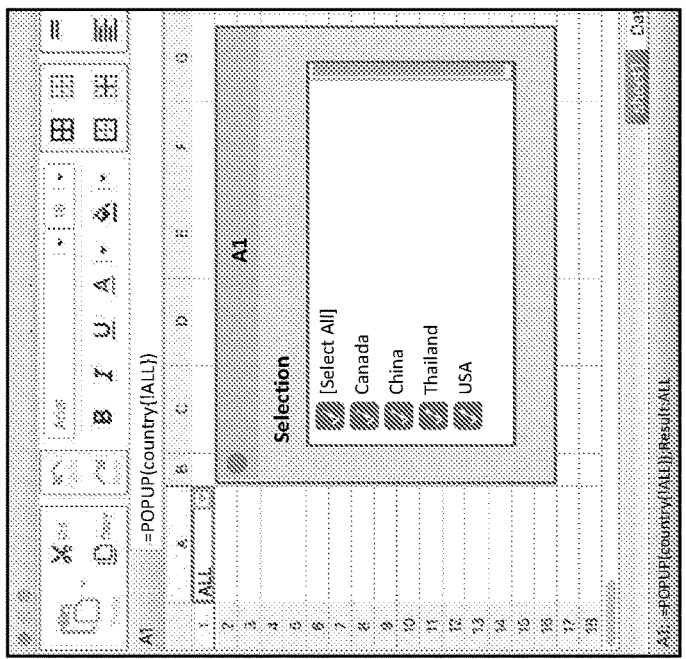
Figure 17C:
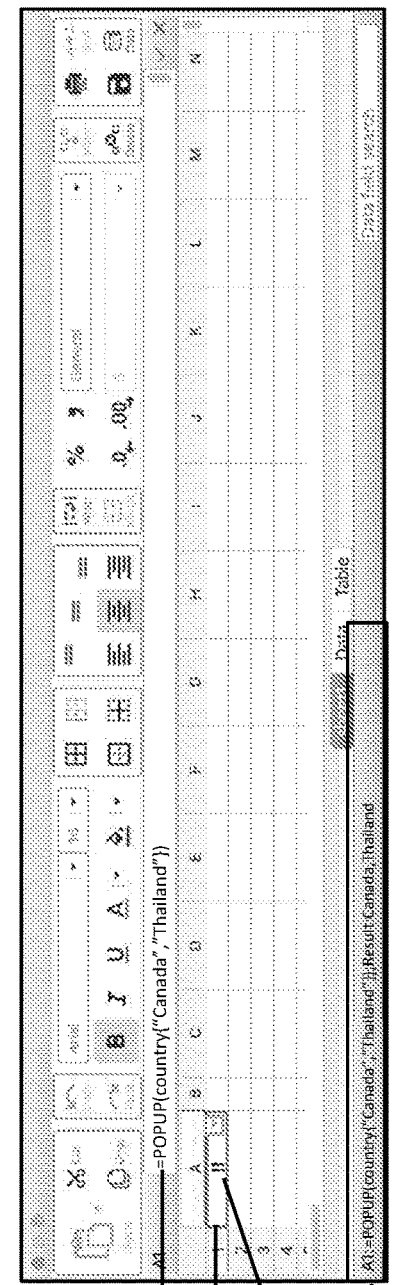

FIG. 17A examples one embodiment of starting with the in-cell pop-up created by inputting the formula 1543 in FIG. 15 which is now displayed in FIG. 17A. However, in FIG. 17B the user changes the selection from 'ALL' to two values, 'Canada' 1747 and 'Thailand' 1757, in the pop-up 1738 and once the pop-up is closed the result is then shown in FIG. 17C. In this embodiment the 'A1' cell value 1782 shows two exclamation marks '!!' 1783 indicating there are two values in the cell. Many different representations of the data within the cell could be used including variants of the selected values like !Canada,!Thailand or just the values Canada, Thailand. The later would be recognizable for what they are, in-cell pop-up values, because of the full time or part-time (when you click the cell) visible button (in some form) within or beside the cell. Methods other than buttons could be used to differentiate the cells visually or cells could be undifferentiated and other methods like double clicking used on the cell to access the drop-down, pop-up or other visual holding the values. In this embodiment, the formula bar 1773 shows the formula below:

=POPUP(country{"Canada","Thailand"})

with the selected values of 'Canada' and 'Thailand' displayed as values of the NSC formulaic data field country shown as 'country {"Canada", "Thailand"}'. If instead the NSC formulaic data descriptor field specified data were numbers or dates, those selected values could be shown in several ways. For example, displaying the numbers as simply numbers separated by a comma and in the case of dates showing them just as dates alone or dates within single quotes like '1/12/20', '1/25/20'.

Different ways of showing the results of the multi-value in-cell selections could be employed by our technology. In another embodiment the formula bar formula 1773 could instead be the one below:

=POPUP(country{ })Selection: Canada, Thailand

Or it could simply be the original formula =POPUP(country{ }) not showing the selection or result but instead showing those in the cell, the pop-up, drop-down or other visual, and/or the Status bar 1793 (in this embodiment at the bottom of the spreadsheet).

Our technology can be applied to data sets with dramatically larger numbers of selections on dramatically larger data sets (e.g., in the tens of millions of values) than Excel, etc. which then makes it very helpful to include a search capability like or similar to the one illustrated in FIG. 11 1143. Like previously discussed for our single value in-cell technology, our multi-value technology accommodates using one or more constraints with data sourced from NSC formulaic data descriptors or spreadsheet cells.

Figure 18:
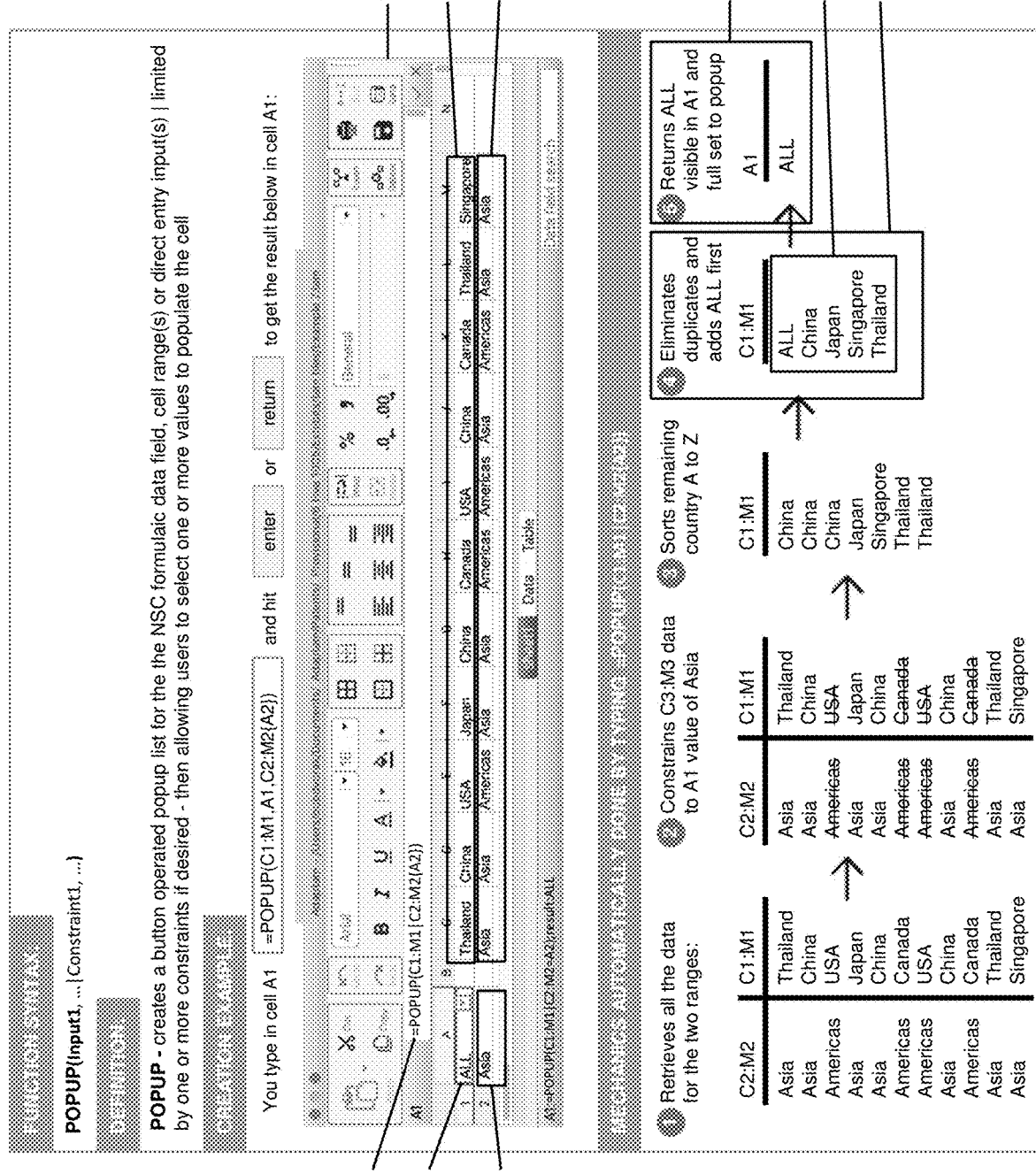
FIG. 18 examples our multi-value in-cell pop-up Function using in-cell data with a constraint (filter)—illustrating its syntax (arguments), definition, a creation example, and the mechanics automatically done.

FIG. 18 examples our multi-value in-cell drop-down, pop-up or other visual applied to spreadsheet cell data employing a constraint. Other embodiments could change the in-cell drop-down pop-up or other visual Function syntax/arguments across the input of NSC formulaic data, the input of cell values or the direct input of values, however this embodiment requires no such change and works for either type of data set input. In this example cell 'A1' 1852 holds the formula 1843:

=POPUP(C1:M1|C2:M2{A2})

Which uses the cell range 'C1:M1' 1856 for input1, and the cell range 'C2:M2' 1866 and the cell 'A2' 1862 as constraint1—as shown in the spreadsheet 1845. In this embodiment the 'A2' constraint has been put in curly braces '{A2}' in the formula 1843 thereby using a syntax similar to one of those used for our NSC formulaic data. As before, those cell ranges could have been anywhere in the spreadsheet and have no need to be near the in-cell drop-down, pop-up or other visual. The automatically executed activities are the same as those done in FIG. 14, accounting for differences in the data designators and in the cell data (which has more Asian countries), until Step 4 1877. In Step 4 after the app eliminates the duplicates it adds in the 'ALL' value as the first or lowest value. Like a previous embodiment, this embodiment overrides the A to Z sort so that ALL is always first. Step 5 1878 then returns to cell 'A1' 1852 the value 'ALL'. It could have easily returned no value, a blank indicating that no selection has been made or a message asking for an input, however in this embodiment it is preferred to send back the value 'ALL' that will work in most formulas using the cell value. The values in Step 4 1887 will then be displayed in the pop-up dropdown or other visual picklist used to select one or more values.

Figure 19:
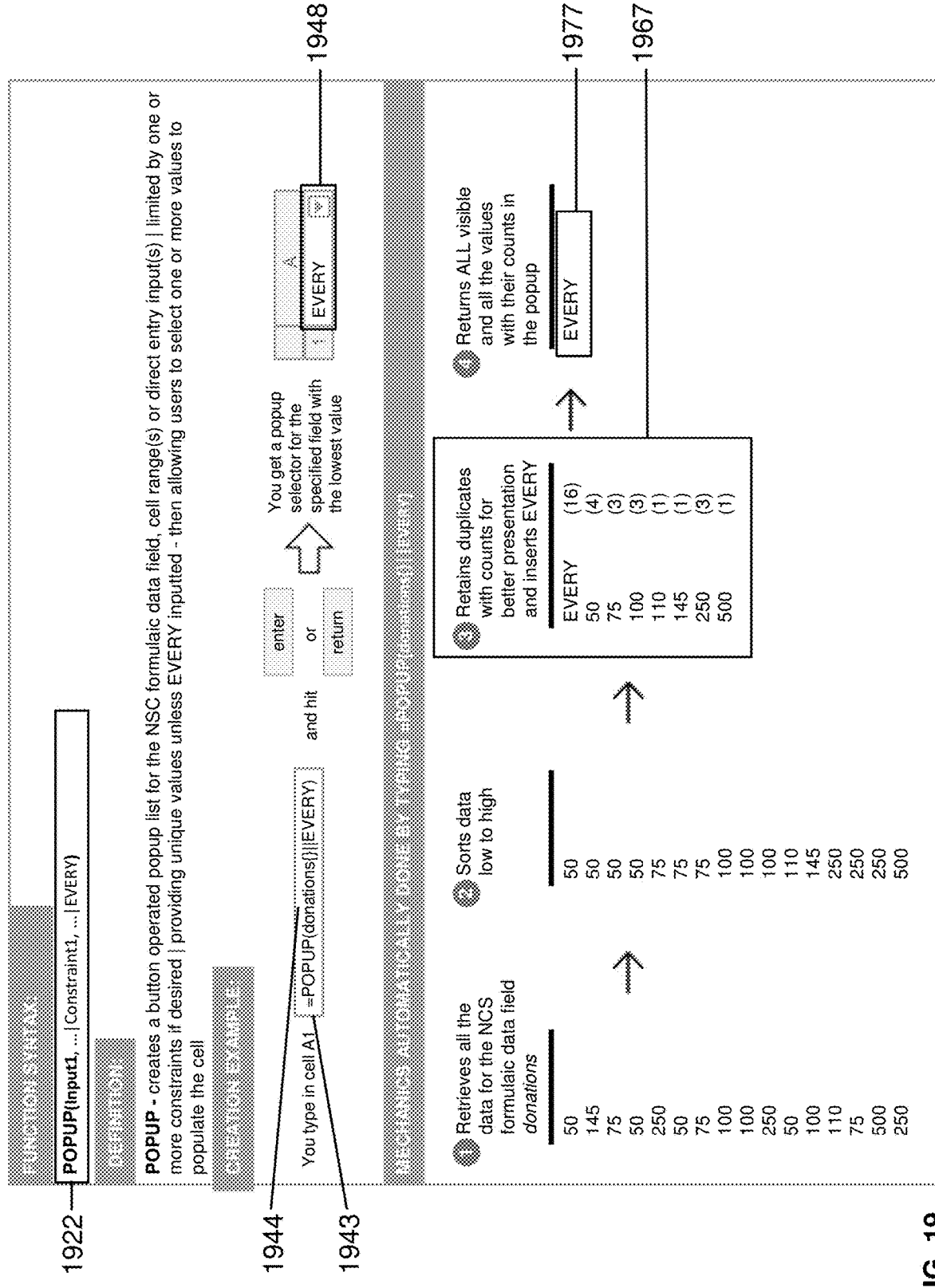
FIG. 19 examples our EVERY value version of our multi-value in-cell dropdown Function using our NSC formulaic data—illustrating its syntax (arguments), definition, a creation example, and the mechanics automatically done.

FIG. 19 examples another embodiment of technology showing the EVERY version of the in-cell multi-value drop-down, pop-up or other visual. In this example, a charity user would like to be able to select different denominations of donations for calculations. The option of keeping 'EVERY' value in the pop-up is added to the syntax/arguments 1922. In cell 'A1' 1948 the user types formula 1943:

=POPUP(donations{ }||EVERY)

They then get an in-cell pop-up displaying the lowest value of the formulaic data descriptor field 'donations' 1944 showing the value 'EVERY' with a pop-up button in cell 'A1' 1948. The activities automatically executed by this Function 1943 are the same as those in done in FIG. 10 until the $3^{rd}$ step 1967 inserts a value of EVERY into the lowest (first) numerically sorted position and instead of listing every value, which it could have, in this embodiment lists each unique value and a count of how many of them in parentheses. In this embodiment the lowest or first value is the default value returned when the formula is written, which is 'EVERY' 1977 that is shown in the cell 'A1' 1948. The pop-up then functions when opened to allow user to select one or more values from the list shown in 1967. This method of presenting the deduped picklist with a count of the duplicates for each value has the benefit of providing the shortest list for user selection while letting users easily see how many actual values are in the list for each value.

Figure 20A:
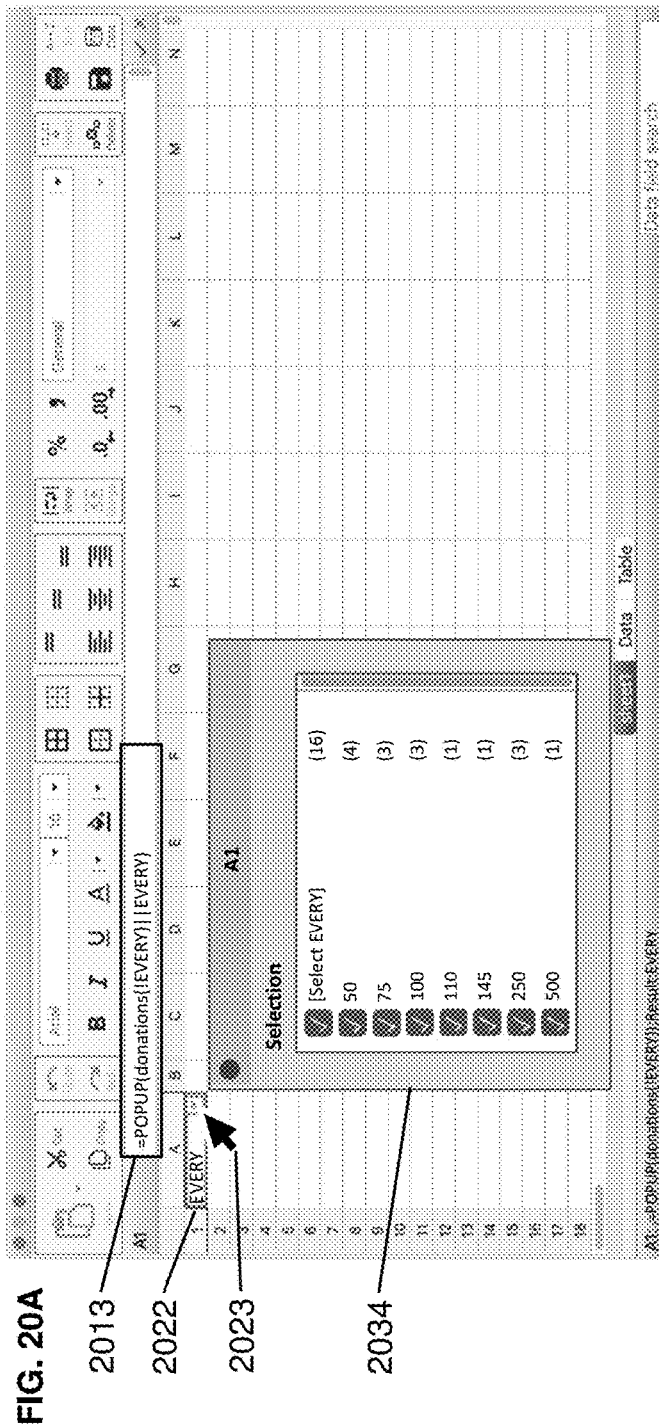
FIG. 20A, FIG. 20B and FIG. 20C example an appearance and use of our EVERY value version multi-value in-cell pop-up for a multiple value selection.
Figure 20C:
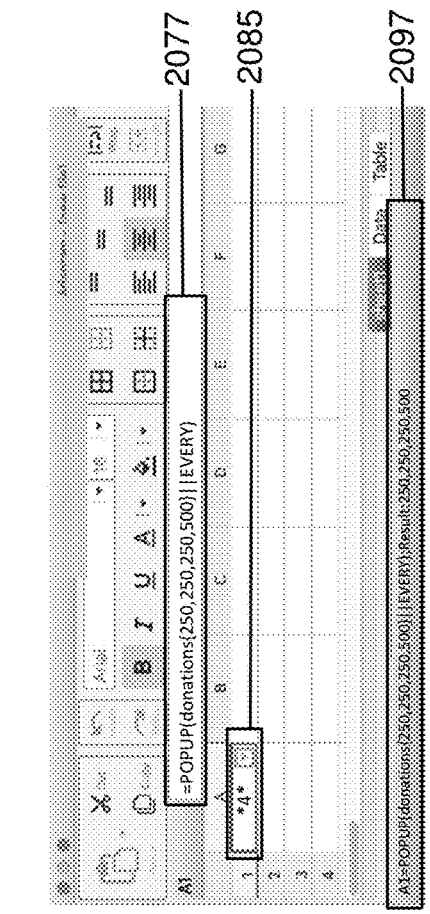
Figure 20B:
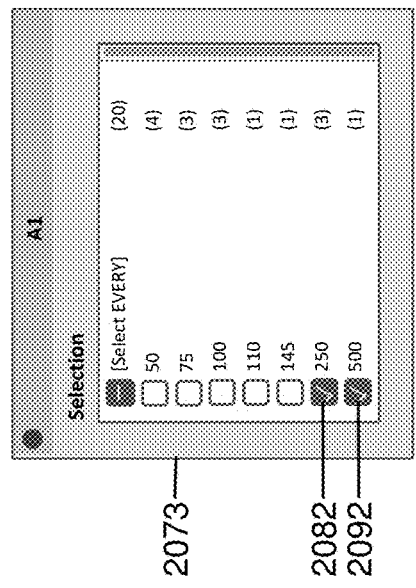

FIG. 20A then examples for this embodiment how the in-cell pop-up 2034 looks when the user clicks on the button 2023 in cell 'A1' 2022. It also examples one embodiment of how the formula bar 2013 displays the formula and value of 'EVERY', in this embodiment using a syntax of '!EVERY' which is a variant of a syntax convention exampled in our previous patent applications for our formulaic data retrievers. Changing selections in the in-cell generated pop-up allows a user to select one or more values. In FIG. 20B the user selects two 'donations' values '250' 2082 and '500' 2092 in the pop-up 2073 which then gives the result within cell 'A1' 2085 shown in the spreadsheet worksheet shown in FIG. 20C. In this embodiment the values '250, 250, 250, 500' 2077 are shown for the NSC formulaic data field 'donations' within the Formula bar. In cell 'A1' 2085 a proxy for the values is displayed '*4*' and within the Status bar at the bottom of the spreadsheet 2097 the formula bar formula is shown as well as the 'Result 250, 250, 250, 500' listing of all the values within the cell. Clearly there are many different ways of displaying the values particularly in situations with large numbers of values where a listing of '250 (3), 500 (1)' conveys the same information potentially more concisely and easily handles situations where there are hundreds of duplicates.

There are many ways to display the multiple values within the cell, its formula bar 2077, Status bar 2097 and dropdown, pop-up or other visual 2073. For example, in another embodiment those displays show the unique values but when other functions use the in-cell values they can retrieve the unique or EVERY set of values depending upon the nature of the function. In this instance a SUM of the cell would sum every value including the duplicates even if a user did not see the duplicates in the dropdown, pop-up or other visual.

As we exampled for the single value in-cell drop-down, pop-up or other visual, directly inputting the values into a multi-value in-cell dropdown, pop-up or other visual can work the same way. The list inputted by the user can be sorted different ways (e.g., ascending, descending or custom), be made unique, kept EVERY or situationally vary, and be displayed in many different ways with or without SEARCH capabilities. Users can then select multiple values as previously described and be able to see the inputted values in Formula bar, Status bar and/or some other visual. All of this makes it incredibly easy for users to create their own in-cell multi-value drop-down, pop-up or other visual.

Now that we have shown several ways to create our in-cell drop-downs, pop-ups or other visuals, we will example using their result or results. Since using a single value result is just like using any other cell value, we will focus our examples of using in-cell drop-down, pop-up or other visuals that populate the cell with more than one value.

Using Multi-Value Cells

Figure 21:
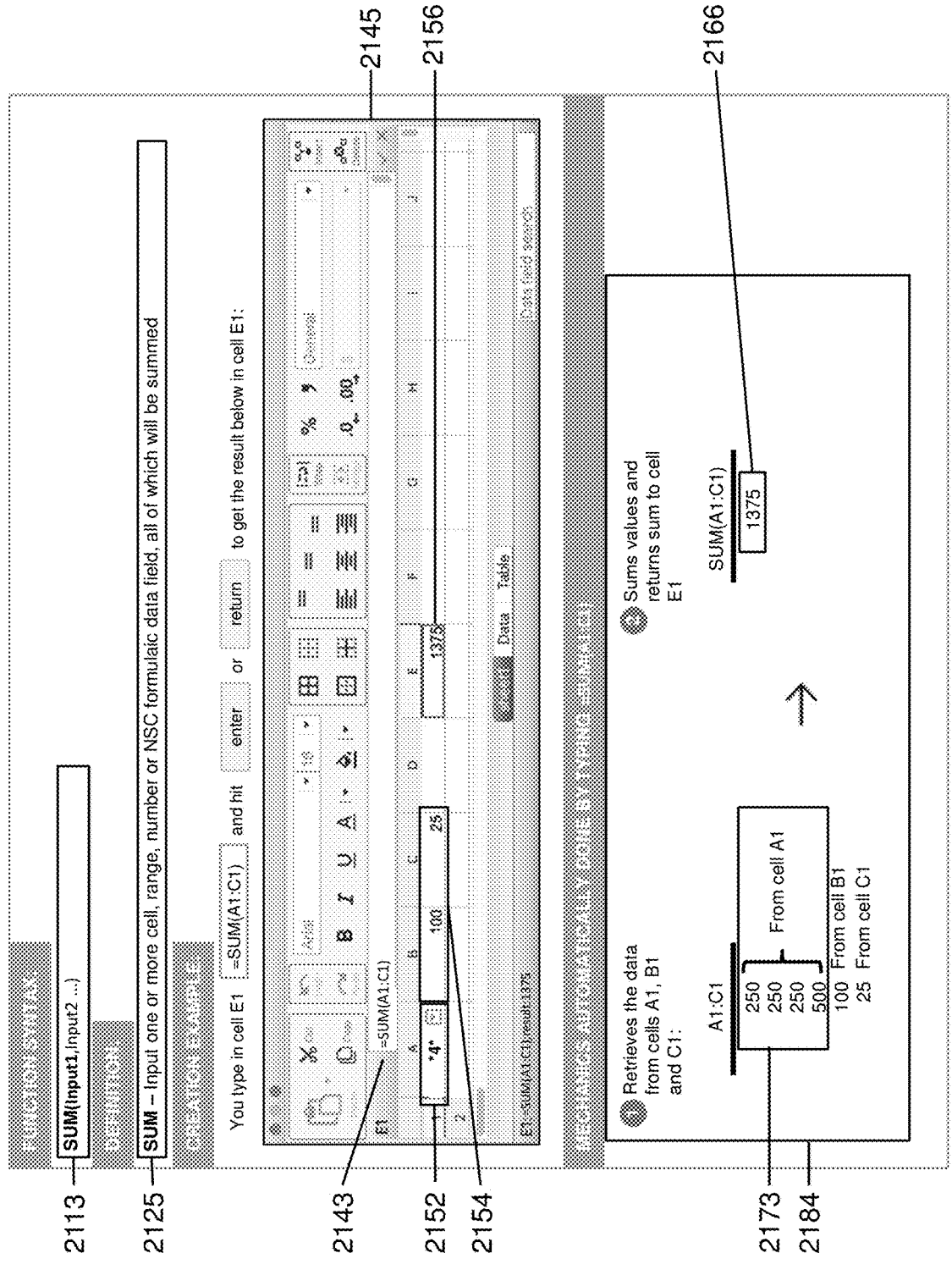
FIG. 21 examples our SUM function using inputs including four inputs from one cell populated by our multi-value in-cell pop-up Function—illustrating its syntax (arguments), definition a creation example, and the mechanics automatically done.

We will first example our technology for using multiple in-cell values using probably the most used spreadsheet function—SUM. However, our technology has altered that SUM function so that it can do all the calculations of a traditional spreadsheet (e.g., Microsoft Excel or Google Sheets) and as shown in FIG. 21 use the same function syntax/arguments 2113 as those spreadsheets while also accommodating multi-value cell input. In spreadsheet 2145, the definition 2125 of what our SUM does includes using our NSC formulaic data fields, as per our previous patent filings. Cell 'A1' 2152 has the four values '250, 250, 250, 500' of cell 'A1' 2085 in FIG. 20C, which were visible in the formula bar 2077 or the 'Result: 250, 250, 250, 500' in the Status bar 2097. The SUM in 'E1' 2156 for the formula 2143 does the activities in 2184 starting with the four values 2173 from cell 'A1' 2152 which are then summed with the values in 'B1' and 'C1' 2154 to calculate the value '1375' 2166 which is then shown in 'E1' 2156. The SUM function which looks indistinguishable from what users are familiar with in their conventional spreadsheets does in our technology calculations using multi-values from a single cell.

Figure 22A:
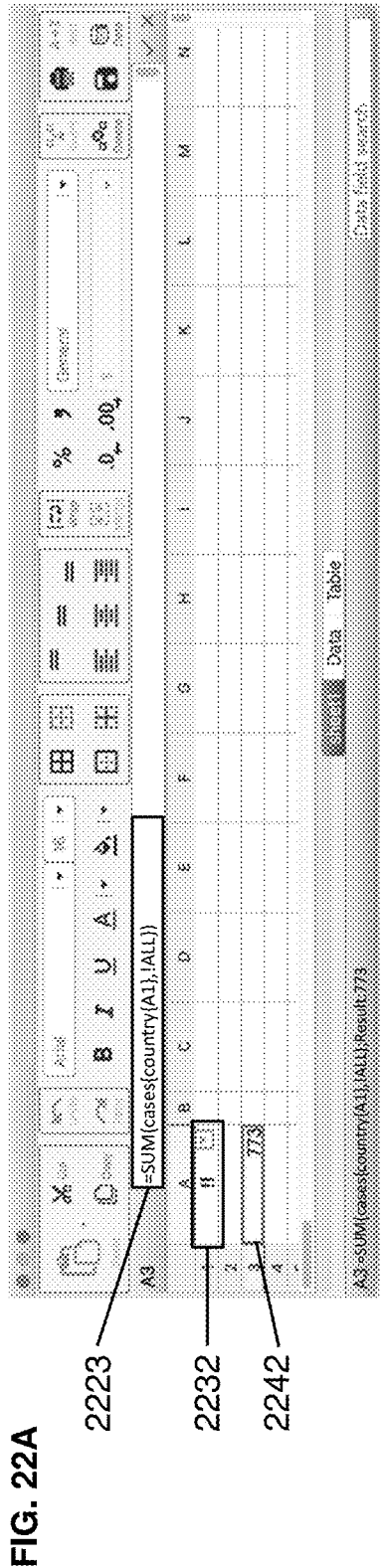
FIG. 22A and FIG. 22B examples our SUM function using two values from one of our multi-value in-cell pop-up Functions as constraints (filters) for an NSC formulaic data field and the mechanics automatically being done.
Figure 22B:
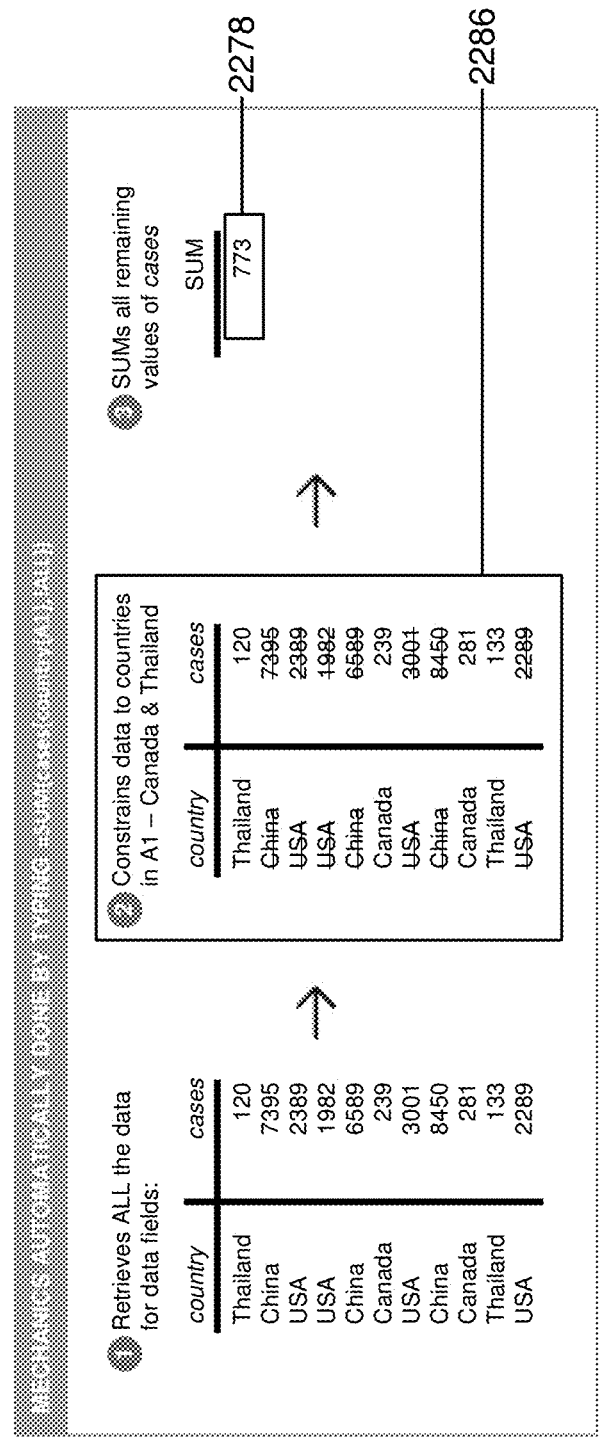

FIG. 22A and FIG. 22B then show another example of how our technology utilizes the multiple values stored within a spreadsheet cell allowing users to do calculations that they cannot currently do in an existing spreadsheet cell and change calculations easily involving multiple values. The formula in cell 'A3' 2223 sums all the values of the NSC formulaic data descriptor field 'cases' constrained to the countries in the cell 'A1' 2232. In this example, those are the values 'Canada' 1747 and 'Thailand' 1757 selected in FIG. 17B and then shown by proxy in cell 'A1' 1782 and now in cell 'A1' 2232. So, the SUM is then carried out as shown in FIG. 22B constraining the number of cancer 'cases' values to only those having a 'country' value of 'Canada' or 'Thailand' 2286—thereby arriving at the SUM value of '773' 2278 which is then returned as the calculated value in cell 'A3' 2242. In. this example it saved the user doing two SUMs for each of the countries. But the real benefit is with larger data sets and more options and then when the user wants to change the calculation. Envision if the user had a data set with fifty countries and decided to do a calculation using ten of them, they do that one selection of the ten countries in the pop-up picklist and the calculation is automatically done. No having to set up a formula with ten SUMs. Now envision the user decides to switch to a different set of countries composed of fifteen different countries. They simply open the pop-up deselect the current ten and select the new fifteen close it and the calculation is done automatically. A huge work savings versus manually changing the formula with ten SUMs to a new one with the fifteen different SUMs.

Figure 23:
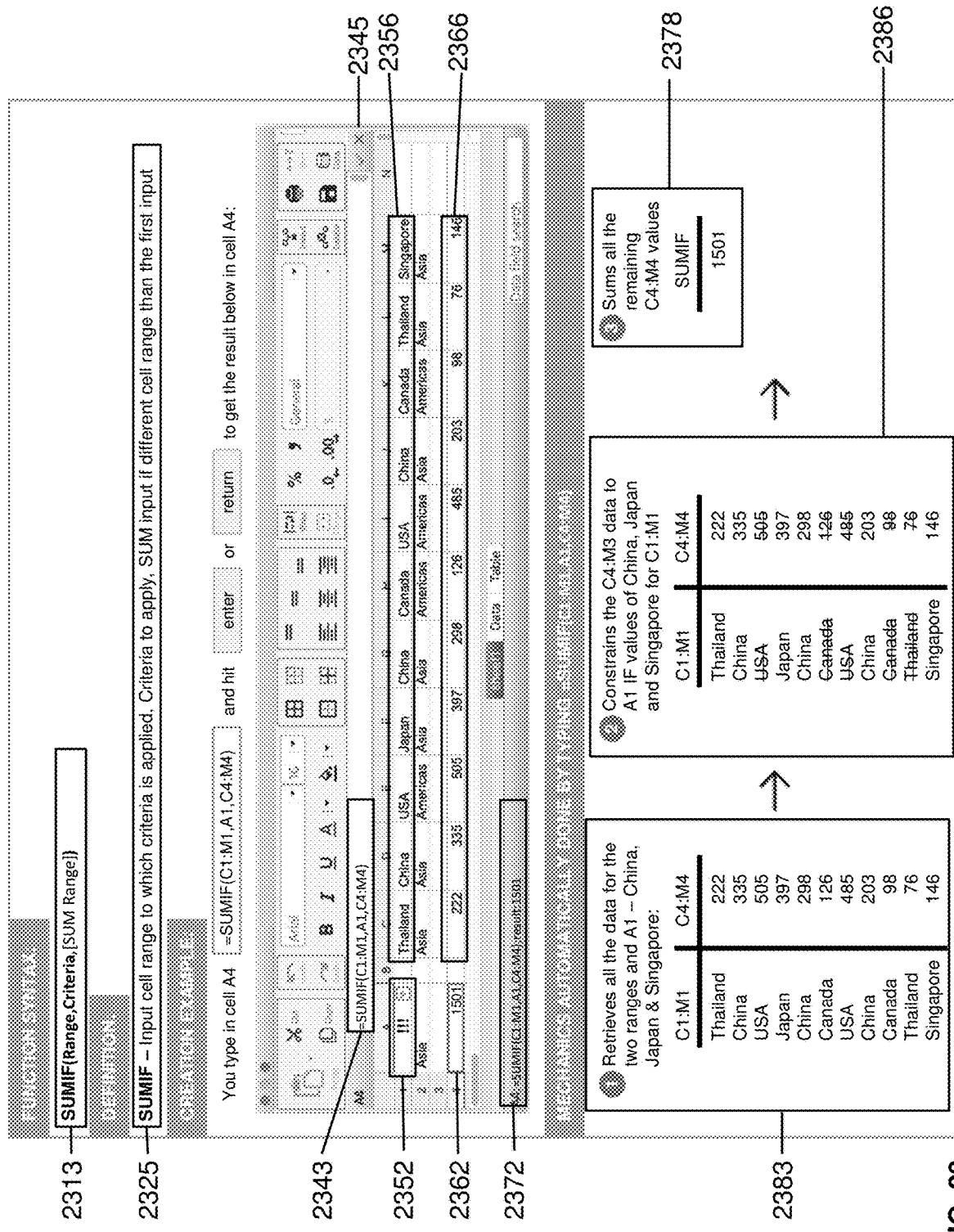
FIG. 23 examples our SUMIF function using three inputs from one cell populated by our multi-value in-cell pop-up Function using in-cell data—illustrating its syntax (arguments), definition, a creation example, and the mechanics automatically done.

FIG. 23 examples one of our functions using spreadsheet cell data together with multiple values from an in-cell multi-value pop-up. The user employs a SUMIF function which has the syntax/arguments 2313 and definition 2325 typically found in traditional spreadsheets. However, in our technology there is a huge difference in that our functions can handle multiple values from a cell, in this case three values ('China', 'Japan' and 'Singapore') supplied from cell 'A1' 2352. Those calculations start with the retrieving of the data 2383 from the cell range 'C1:M1' 2356, the cell range 'C4:M4' 2366 and the cell 'A1' 2352. Then our SUMIF function constrains the data to the three values in cell 2352, 'China', 'Japan' and 'Singapore', as shown in 2386. Finally, it does the SUM of the remaining values as shown in 2378 to get the value of '1501' shown in cell 'A4' 2362 for the formula shown in the formula bar 2343 and with the full layout in the status bar 2372.

Consider how much simpler this is than having to do three SUMIF calculations and then sum their values (because a single SUMIFS won't do this calculation). And if the user decides to instead calculate the value for only two different countries the user employing a conventional spreadsheet would need to eliminate one of the SUMIF calculations, make any changes to the country criteria inputs to calculate the value, while our user simply changes the selections in the 'A1' 2352 in-cell pop-up picklist. Envision instead a situation where instead of 5 options there are 50 and you want to quickly look at different combinations—the traditional spreadsheet user has to resort to a Pivot Table with filters, if they happen to be in the smaller fraction of users who know how to use a Pivot Table, as combinations of SUMIF calculations would require an immense amount of work. They would also then have to do a calculation on top of the Pivot Table to bring the value they desire to the cell where they want it—all of which requires a great deal of work.

The power of this technology becomes even more evident when formulas that cannot be constructed with any current spreadsheet cell or even a current spreadsheet Pivot Table technology are easily done by users of our technology using our in-cell multi-value Function dropdowns, pop-ups or similar visualization values. Current spreadsheet Pivot Tables work one function at a time, and do not allow the combination of multiple algebraic operators or combining algebraic operators and functions. Our technology supports formulas employing combinations of many functions and algebraic operators. Our technology also supports new functions that are not available in existing spreadsheets, such as additional types of the COUNT function that counts text, dates, true and false or additional types of SUM functions like one that ignores divide by zero errors.

FIG. 24A through FIG. 24D example a cancer researcher looking to understand the cost of treating patients in different regions of the world. They have data for the seven countries shown in the in-cell multi-value pop-up displayed in FIG. 24A. Their first calculation in FIG. 24B will be for the countries in North America, so they select 'Canada' 2422 and 'USA' 2442 which then contains the two values in the in-cell multi-value pop-up 2433 in 'A1' 2434 within the spreadsheet 2436. The formula in cell 'C1' 2435 then uses the two values in cell 'A1' 2434 five different times doing the calculation shown in the formula bar formula for 'C1' 2427—determining the cost per patient in North America (Canada and USA) for cancer treatments of '$21,053' 2435. Starting with FIG. 24C, the user then decides to do the calculation for Europe and therefore changes the selected values in the in-cell pop-up 2483 to 'France' 2472, 'Germany' 2482 and 'UK' 2492 and closes the pop-up to give the proxy '!!!' in cell 'A1' 2484 of the spreadsheet 2486. That change then automatically recalculates the value in cell 'C1' 2485 for the three countries, 'France', 'Germany' and 'UK', to be '$19,235' 2485. The formula for 'C1', shown in the formula bar 2477, has not changed but is now using three rather than two countries in each of the five NSC formulaic data fields. Employing our technology, the same calculation could have been done with data residing in spreadsheet cells replacing each SUM with a SUMIF and the COUNT with a COUNTIF. There is no equivalent using a conventional spreadsheet and any attempt to replicate this would require numerous separate calculations which would be very difficult with 7 countries and virtually impossible without resorting to using a spreadsheet embedded programming language if instead there were 180 countries.

Conventional spreadsheet Pivot Tables are also limited to a short list of functions/operations, e.g., Excel 2019 has Sum, Count, Average, Max, Min, Product, Count Numbers, StdDev, StdDevp, Var and Varp. The pivot table functions can only be done by themselves, not combined in complex algebraic formulas. Using our technology, users can do spreadsheet cell calculations that include multiple functions combined with multiple math operations (e.g., +, −, *, / or ^) drawing data from multiple NSC formulaic data descriptor fields coming from multiple different external (to the spreadsheet cells) tables of data and/or multiple ranges of cell values. Complex multifunction formulas can now be easily fed multiple cell values from our in-cell multi-value dropdowns, pop-ups or other visual variant picklists and changes made as simply as changing selections within the dropdowns, pop-ups or other visual variant picklists.

Functions that most users have grown used to using, like SUM, COUNT, MIN, MAN MEDIAN, AVERAGE and IF can be altered by our technology to use the same syntax used in conventional spreadsheets and now accept multiple inputs from a single cell. As well as those functions more advanced variants like the combinations of those functions with IF (e.g., SUMIF), A (e.g., MAXA) or IFS (e.g., COUNTIFS) that in our technology accept multiple inputs from a single cell. The basic (e.g., STDDEV, STDEVP, VAR and VARP) and more sophisticated statistical functions (e.g., GEOMEAN, Percentile, Quartile, Rank TTEST, or Z. TEST) that work on data ranges or data arrays are facilitated by our technology to accept multiple values from a single cell without having to change how users currently setup the functions. FIG. 25 gives more examples of the types of existing spreadsheet functions that our technology alters to use the input from a cell or cells holding multiple values. This allows users of our technology to apply the capabilities they know to cells with multiple values with nothing more complicated than including the multi-value cell in their formulas as they would any other cell. No additional work, no additional learning.

Cells Equaling Multi-Value Cells

In our technology a cell can equal an in-cell drop-down, pop-up or other visual multi-value cell and just like a normal equivalence get the value or values in that cell. Like regular cells that means you cannot change the value in that cell independently of the cell it references. In this embodiment it means that you can open the referencing cell drop-down, pop-up or other visual to see the values it holds but you cannot change the value. To change the value the user needs to go to the referenced cell and change its value, at which point the new value or values will be automatically changed in all the cells referencing it.

Figure 26B:
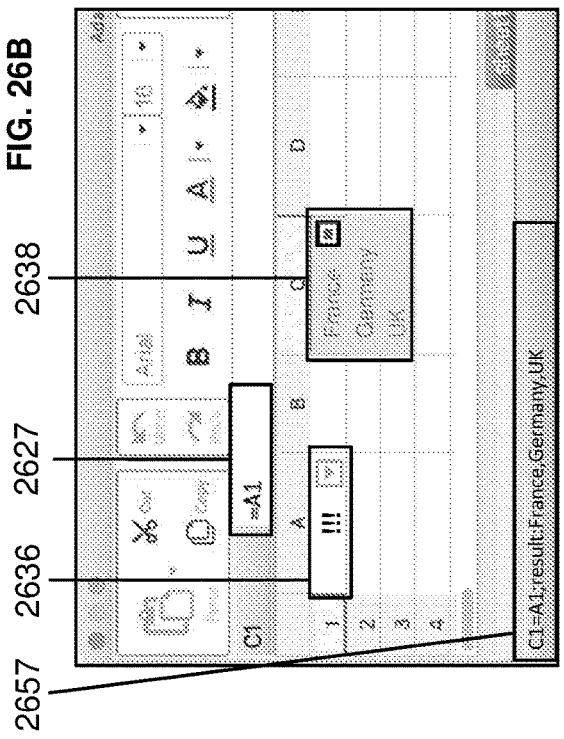
FIG. 26A, FIG. 26B and FIG. 26C examples in-cell multi-value equality cells in a dropdown and other visual usage.
Figure 26C:
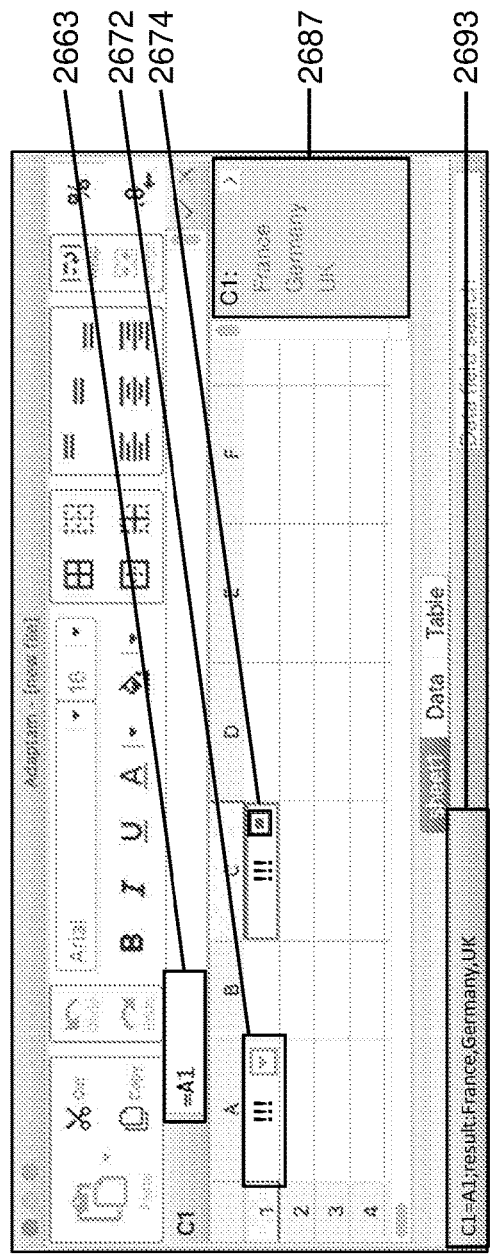
Figure 26A:
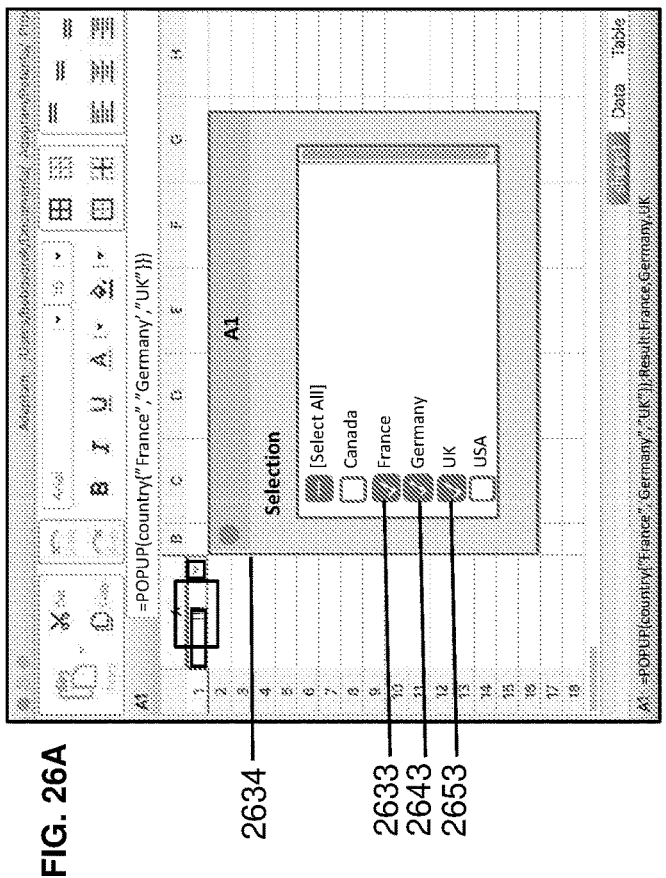

FIG. 26A and FIG. 26B-C example two different visual embodiments of in-cell multi-value cells set equaling (replicating) a multi-value cell. Those cells can display for users' multiple values and those values are usable by formulas referencing them, but the values cannot be changed within the cell. Each of those examples gets its values 2633, 2643, 2653 from a cell 'A1' which was populated by the pop-up 2634 in FIG. 26A. In neither situation is the user given a way to change the values directly in the cell that is equal to the in-cell pop-up cell. In this embodiment the user is made aware of the inability to directly change values by the pop-up button having a square rather than an arrow and the values being grayed/disabled for selection (as shown in 2683). In FIG. 26B the user has clicked on that button in cell 'C1' to expose a dropdown 2638 which shows the three values, 'France', 'Germany' and 'UK', which are in the cell coming from the cell 'A1' 2636. The Formula bar 2627 shows that the cell C1'=A1' which is where it gets the three values. All of this is shown in the Status bar 2657 which shows:

$C1=A1$; result: France, Germany, UK

FIG. 26C displays the values in another visual, a sidebar. The user has clicked on the button in cell 'C1' 2674 to expose the sidebar 2687 which shows the three values, 'France', 'Germany' and 'UK', which are in cell 'C1' 2674. The Formula bar 2663 shows that the cell C1 '=A1' 2673 which is where it gets the three values from. The Status Bar 2693 again lays all of this out showing:

$C1=A1$; result: France, Germany, UK

These embodiments are all usable by formulas as described previously, however instead of allowing users to change the value in the cell these values change when the values in the source (referenced) cell change. Thereby users can alter many different calculations with a single change replicated by these in-cell multi-value equals (replicating) cells.

Computer System

FIG. 27 is a block diagram of an example computer system 2700, according to one implementation. Computer system 2710 typically includes at least one processor 2772 which communicates with a number of peripheral devices via bus subsystem 2750. These peripheral devices may include a storage subsystem 2726 including, for example, memory devices and a file storage subsystem, user interface input devices 2738, user interface output devices 2776, data I/O interfaces 2778, and a network interface subsystem 2774. The input and output devices allow user interaction with computer system 2710. Network interface subsystem 2774 provides an interface to outside networks, including an interface to communication network, and is coupled via communication network to corresponding interface devices in other computer systems or in the cloud and usable for cloud applications.

User interface input devices 2738 may include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2710 or onto communication network.

User interface output devices 2776 may include a display subsystem, a printer, a fax machine, or non-visual displays such as audio output devices. The display subsystem may include a touch screen, a flat-panel device such as a liquid crystal display (LCD), a projection device, a cathode ray tube (CRT), or some other mechanism for creating a visible image. The display subsystem may also provide a non-visual display such as via audio output devices. In general, use of the term "output device" is intended to include all possible types of devices and ways to output information from computer system 2710 to the user or to another machine or computer system.

Storage subsystem 2726 stores programming and data constructs that provide the functionality of some or all of the modules and methods described herein. These software modules are generally executed by processor 2772 alone or in combination with other processors.

Memory 2722 used in the storage subsystem can include a number of memories including a main random-access memory (RAM) 2734 for storage of instructions and data during program execution and a read only memory (ROM) 2732 in which fixed instructions are stored. A file storage subsystem 2736 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 2736 in the storage subsystem 2726, or in other machines accessible by the processor.

Bus subsystem 2750 provides a mechanism for letting the various components and subsystems of computer system 2710 communicate with each other as intended. Although bus subsystem 2750 is shown schematically as a single bus, alternative implementations of the bus subsystem may use multiple busses.

Computer system 2710 can be of varying types including a workstation, server, computing cluster, blade server, server farm, or any other data processing system or computing device. Due to the ever-changing nature of computers and networks, the description of computer system 2710 depicted in FIG. 27 is intended only as one example. Many other configurations of computer system 2710 are possible having more or fewer components than the computer system depicted in FIG. 27.

Some Particular Implementations

Some particular implementations and features are described in the following discussion. The technology disclosed can be practiced in a variety of methods, devices, combination of devices or systems or a computer readable media impressed with program instructions that, when executed on hardware cause the hardware either to carry out a disclosed method or combine with the hardware to form a disclosed device or system.

One method implementation of the technology solves the problem of simplifying the entry of values into a spreadsheet cell while organizing and constraining the values that can selected. FIG. 9A, FIG. 9B, FIG. 10 and FIG. 13 example one of our spreadsheet (predefined formula) functions creating a drop-down picklist through a user writing a simple formula. That formula specifies the list source and then, as shown in the automatic mechanics of each example, our technology automatically sorts the data, eliminates duplicates and returns an initial value to the cell that is from the list source, blank or an instruction. The dropdown is then ready to present the picklist sorted and deduplicated, as shown in FIG. 9B, and upon receiving a new selection from the picklist replaces the previous value in the cell, as also shown in FIG. 9B. This basic interface can be combined with one or more of the features in the following paragraphs.

FIG. 9A, FIG. 9B, FIG. 10 and FIG. 12B example where the list source is from our Non-spreadsheet cell formulaic data. FIG. 13 and FIG. 14 example where the list source is from spreadsheet cell values. As exampled in the prior text the list source can also be supplied directly by the user typing it into the function formula. All these different data sources can be accommodated by a single function syntax as exampled in FIG. 14 and FIG. 15.

In a further embodiment of our technology the source list can be constrained (filtered) by user specified value(s), as shown in FIG. 12B, FIG. 14 and FIG. 18. Thereby giving users the ability to custom tailor the content of their dropdowns, pop-ups or other visuals. That tailoring can take place by directly entering a constraint value into the function formula, as exampled in FIG. 12B, or indirectly via a referenced cell, as exampled in FIG. 14 and FIG. 18.

The user interface picklist can be presented in a dropdown, pop-up or other visual in embodiments of our technology, as exampled in FIG. 9B, FIG. 11, FIG. 16A, FIG. 16B, FIG. 17A, FIG. 17B, FIG. 26A, and FIG. 26C. This allows users to tailor the user interface to the usage situation such as adding search in settings with large numbers of values or positioning the visual where desired.

A further embodiment of our technology provides users with a picklist presenting a deduped list of values where every value has a count of the number of duplications, exampled in FIG. 19 through FIG. 20B. This maintains the ease of selection with the shorter deduped list but gives the user the information on how many of each value there are in the data.

A further implementation of our technology, exampled in FIG. 15 through FIG. 20C, allows the user to select more than one value from the picklist and store those multiple values for use within the cell. This in combination with our revised versions of the spreadsheet functions (e.g., SUM, COUNT, and STDEV) that use multiple value inputs, opens up a whole new class of calculations that cannot be done in regular spreadsheet cells. Calculations that use multiple values supplied by a single spreadsheet cell and are readily changeable for altering those calculations.

A further implementation of our technology allows a cell to equal one of the multi-value picklist cells. That cell then replicates the multiple values of the referenced cell, as exampled in FIG. 26A through FIG. 26C, but does not allow the changing of the values in those cells. Like a regular cell set equal to another cell our multi-value equaling cells cannot change their values within the cell. Instead values of those cells change as the referenced cell changes values. However, in our technology the equaling cell shows the list of selected values to the user in a drop-down, pop-up or other visual with no ability to change the values in the cell. The visual could also show the complete picklist with the selected values differentiated so the user sees the selections and the entire list available in the source cell. So, these cells effectively have the list but not the pick capability and supply cells referencing this cell the multiple selected values.

An implementation of our revised functions, that can use the multiple values from a drop-down, pop-up and other visual cell, are exampled in FIG. 21 through FIG. 24D. Our technology alters the existing spreadsheet functions (example list in FIG. 25), that use range inputs (C2:C25) and/or array inputs (e.g., SUM (30, 25, 50, 79, D10)), to utilize multiple values from a single cell. Our technology also supports new functions (e.g., COUNT_TEXT, COUNT_DATE, and SUM_IGNORE_DIV0) that can use those multiple values from a single cell. Those multiple value cells can be referenced directly or as part of a range. To simplify this for users an implementation of our technology alters the existing functions to accept the multiple values from a single cell without changing the syntax/arguments of the existing functions, as exampled in FIG. 21 and FIG. 23 where the syntax/arguments of SUM and SUMIF are no different than in a regular spreadsheet. These altered functions are then capable of using our Non-spreadsheet cell data, as exampled in FIG. 21, FIG. 22A, FIG. 22B, FIG. 24B and FIG. 24D, and capable of using regular cell data, as exampled in FIG. 23. Similarly, in an implementation of our technology our range/array functions discussed above could use multiple values from a cell where the source list is inputted by the user. One or more of these features can be used with the basic interface describe above.

The technology disclosed can be practiced as a method, system or computer readable media. A computer-implemented system implementation can include at least one processor and memory coupled to the processor, the memory holding program instructions that, when executed, implement a method simplifying the entry of values into a spreadsheet cell while organizing and constraining the values that can selected. This system implemented method can include any of the features described above. A non-transitory computer-readable medium holding program implementation can include instructions that, when executed on a processor, implement a method simplifying the entry of values into a spreadsheet cell while organizing and constraining the values that can selected. As with the system, the method implemented by instructions held by the computer-readable medium can include any of the features describe above.

While the technology disclosed is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the innovation and the scope of the following claims.

I claim as follows:

1. A method of providing a user interface picklist for inserting a value into a cell, using a spreadsheet (predefined formula) function running on a system including at least one processor and memory coupled to the processor including:
    responsive to a user interface picklist function in a cell of the spreadsheet that references a list source that is not adjacent to the cell that holds the user interface picklist function,
    automatically retrieving, sorting and deduplicating values from the list source without modifying the list source itself;
    returning an initially displayable value to the cell that is from the list source, is blank awaiting selection from the list source, or is an instruction regarding use of the list source;
    making the picklist for the cell available responsive to the selection by presenting the sorted and deduplicated values; and
    upon receiving a selection from the picklist, replacing the initially displayable value returned by the picklist for use in the cell.

2. The method of claim 1, wherein the list source is from Non-spreadsheet cell data.

3. The method of claim 1, wherein the list source is from spreadsheet cells.

4. The method of claim 1, wherein the list source is user inputted.

5. The method of claim 1, wherein syntax and arguments of the function are unchanged across different data sources.

6. The method of claim 1, wherein the source list is constrained (filtered) via a referenced cell by user specified value or values that are arguments of the picklist function.

7. The method of claim 1, wherein the picklist is presented from the cell in a drop-down or pop-up visual.

8. The method of claim 1, wherein the picklist after deduplicating is presented with a count of duplicates for values deduplicated.

9. The method of claim 1, wherein the user can make more than one selection from the picklist and the user's multiple selections will be stored in the cell.

10. The method of claim 9, wherein a cell equaling the picklist cell replicates the multiple values, makes them usable by other cells but where the source list or picklist selected values can only be changed by changing the values in referenced cell.

11. An improved method of applying a spreadsheet function running on a system including at least one processor and memory coupled to the processor that operates on values in a list or range of cells the improvement including:
    evaluating the list or range on which an improved spreadsheet function operates and identifying a reference to a first cell;
    returning from the first cell multiple values selected from a picklist function in the first cell; and
    applying the improved spreadsheet function to calculate an algebraic or statistical result using the multiple values returned from the first cell, as if they were individual values returned by reference to multiple cells before the improvement.

12. The method of claim 11, wherein syntax of the spreadsheet function is unchanged by the improvement.

13. The method of claim 11, wherein the picklist function in the first cell composes the picklist from Non-spreadsheet cell data.

14. The method of claim 11, wherein the picklist function in the first cell composes the picklist from a range of cell data.

15. The method of claim 11, wherein the picklist function in the first cell composes the picklist from user input.

16. A computer-implemented system including at least one processor and memory coupled to the processor, the memory holding program instructions that, when executed, implement a method of providing a user interface picklist for inserting a value into a cell, using a spreadsheet (predefined formula) function, the method including:
    responsive to a user interface picklist function in a cell of the spreadsheet that references a list source that is not adjacent to the cell that holds the user interface picklist function,
    automatically retrieving, sorting and deduplicating values from the list source without modifying the list source itself;
    returning an initially displayable value to the cell that is from the list source, is blank awaiting selection from the list source, or is an instruction regarding use of the list source;
    making the picklist for the cell available responsive to the selection by presenting the sorted and deduplicated values; and
    upon receiving a selection from the picklist, replacing the initially displayable value returned by the picklist for use in the cell.

17. The system of claim 16, wherein the list source is from Non-spreadsheet cell data.

18. The system of claim 16, wherein the list source is from spreadsheet cells.

19. The system of claim 16, wherein the list source is user inputted.

20. The system of claim 16, wherein syntax and arguments of the function are unchanged across different data sources.

21. The system of claim 16, wherein the source list is constrained (filtered) via a referenced cell by user specified value or values that are arguments of the picklist function.

22. The system of claim 16, wherein the picklist is presented in a drop-down or pop-up visual.

23. The system of claim 16, wherein the picklist after deduplicating is presented with a count of duplicates for values deduplicated.

24. The system of claim 16, wherein the user can make more than one selection from the picklist and the user's multiple selections will be stored in the cell.

25. The system of claim 24, wherein a cell equaling the picklist cell replicates the multiple values, makes them usable by other cells but where the source list or picklist selected values can only be changed by changing the values in referenced cell.

26. An improved system that applies a spreadsheet function that operates on values in a list or range of cells, the improvement including:
    a hardware processor, memory coupled to the processor, and instructions loaded into the memory configurable to cause the processor to carry at a method, including:
    evaluating the list or range on which an improved spreadsheet function operates and identifying a reference to a first cell;
    returning from the first cell multiple values selected from a picklist function in the first cell; and
    applying the improved spreadsheet function to calculate an algebraic or statistical result using the multiple values returned from the first cell, as if they were individual values returned by reference to multiple cells before the improvement.

27. The system of claim 26, wherein syntax of the spreadsheet function is unchanged by the improvement.

28. The system of claim 26, wherein the first cell composes the picklist from Non-spreadsheet cell data.

29. The system of claim 26, wherein the first cell composes the picklist from a range of cell data.

30. The system of claim 26, wherein the first cell composes the picklist from user input.

31. A non-transitory computer-readable medium holding program instructions that, when executed on a processor, implement a method of providing a user interface picklist for inserting a value into a cell, using a spreadsheet (predefined formula) function, the method including:
    responsive to a user interface picklist function in a cell of the spreadsheet that references a list source that is not adjacent to the cell that holds the user interface picklist function,
    automatically retrieving, sorting and deduplicating values from the list source without modifying the list source itself;
    returning an initially displayable value to the cell that is from the list source, is blank awaiting selection from the list source, or is an instruction regarding use of the list source;
    making the picklist for the cell available responsive to the selection by presenting the sorted and deduplicated values; and
    upon receiving a selection from the picklist, replacing the initially displayable value returned by the picklist for use in the cell.

32. The non-transitory computer-readable medium of claim 31, wherein the list source is from Non-spreadsheet cell data.

33. The non-transitory computer-readable medium of claim 31, wherein the list source is from spreadsheet cells.

34. The non-transitory computer-readable medium of claim 31, wherein the list source is user inputted.

35. The non-transitory computer-readable medium of claim 31, wherein syntax and arguments of the function are unchanged across different data sources.

36. The non-transitory computer-readable medium of claim 31, wherein the source list is constrained (filtered) via a referenced cell by user specified value or values that are arguments of the picklist function.

37. The non-transitory computer-readable medium of claim 31, wherein the picklist is presented in a drop-down or pop-up visual.

38. The non-transitory computer-readable medium of claim 31, wherein the picklist after deduplicating is presented with a count of duplicates for values deduplicated.

39. The non-transitory computer-readable medium of claim 31, wherein the user can make more than one selection from the picklist and the user's multiple selections will be stored in the cell.

40. The non-transitory computer-readable medium of claim 39, wherein a cell equaling the picklist cell replicates the multiple values, makes them usable by other cells but where the source list or picklist selected values can only be changed by changing the values in referenced cell.

41. A non-transitory computer-readable medium including computer instructions that, when executed on a hardware processor, make the processor configurable to carry out an improved method of applying a spreadsheet function that operates on values in a list or range of cells, the improvement including:
- evaluating the list or range on which an improved spreadsheet function operates and identifying a reference to a first cell;
- returning from the first cell multiple values selected from a picklist function in the first cell; and
- applying the improved spreadsheet function to calculate an algebraic or statistical result using the multiple values returned from the first cell, as if they were individual values returned by reference to multiple cells before the improvement.

42. The non-transitory computer-readable medium of claim 41, wherein syntax of the spreadsheet function is unchanged by the improvement.

43. The non-transitory computer-readable medium of claim 41, wherein the picklist function in the first cell composes the picklist from Non-spreadsheet cell data.

44. The non-transitory computer-readable medium of claim 41, wherein the picklist function in the first cell composes the picklist from a range of cell data.

\* \* \* \* \*